United States Patent
Ludlow

(10) Patent No.: US 10,299,096 B2
(45) Date of Patent: May 21, 2019

(54) AUTOMATIC WIRELESS NETWORK FORMATION

(71) Applicant: Crestron Electronics, Inc., Rockleigh, NJ (US)

(72) Inventor: Jeffrey Ludlow, Woodcliff Lake, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 69 days.

(21) Appl. No.: 15/789,541

(22) Filed: Oct. 20, 2017

(65) Prior Publication Data

US 2019/0124465 A1 Apr. 25, 2019

(51) Int. Cl.
| | |
|---|---|
| *H04W 84/18* | (2009.01) |
| *H04W 4/80* | (2018.01) |
| *H04W 48/16* | (2009.01) |
| *H04L 12/28* | (2006.01) |
| *H04W 48/18* | (2009.01) |

(52) U.S. Cl.
CPC .............. *H04W 4/80* (2018.02); *H04L 12/28* (2013.01); *H04W 48/16* (2013.01); *H04W 48/18* (2013.01)

(58) Field of Classification Search
CPC ....... H04W 4/80; H04W 48/16; H04W 48/18; H04W 84/18; H04W 88/16; H04L 12/28; H05B 37/0272; H05B 37/0227; H05B 37/0218; F21V 23/04; H02B 20/46
See application file for complete search history.

(56) References Cited

U.S. PATENT DOCUMENTS

| | | | |
|---|---|---|---|
| 6,144,855 A | 11/2000 | Slovin | |
| 6,393,486 B1 | 5/2002 | Pelavin et al. | |
| 6,574,266 B1 | 6/2003 | Haartsen | |
| 7,319,877 B2 | 1/2008 | Krumm et al. | |
| 7,933,612 B2 | 4/2011 | Counts et al. | |
| 8,022,822 B2 | 9/2011 | Liang et al. | |
| 8,457,013 B2* | 6/2013 | Essinger | H04W 4/50 370/254 |
| 8,538,596 B2 | 9/2013 | Gu et al. | |
| 8,892,135 B2 | 11/2014 | Werb et al. | |
| 9,191,886 B2* | 11/2015 | Ludlow | H04W 48/18 |
| 9,716,686 B2* | 7/2017 | Erickson | G06F 16/33 |

(Continued)

*Primary Examiner* — Pablo N Tran
(74) *Attorney, Agent, or Firm* — Crestron Electronics, Inc.

(57) ABSTRACT

Systems, devices, and methods for automatically forming a wireless personal area network (PAN) comprising a network auto-formation (NAF) process. At least one network coordinating device initializes a PAN and transmits at least one beacon comprising PAN information. A network joining device performs a number of scan/listen cycles by actively scanning a plurality of wireless channels for PANs by masking out channels in a scan channel mask, and listening for beacons on channels in a listen channel list. The scan channel mask and the listen channel list are updated during each scan/listen cycle. The scan channel mask may comprise channels containing desired PANs, non-desired PANs, and channels on which beacons were heard. The listen channel list may comprise channels containing desired PANs and channels on which beacons were heard. The NAF process further comprises receiving PAN information included in heard beacons and attempting to join the best network based on the PAN information.

32 Claims, 13 Drawing Sheets

(56) References Cited

U.S. PATENT DOCUMENTS

| | | | |
|---|---|---|---|
| 9,913,353 B1* | 3/2018 | Ackmann | H05B 37/0272 |
| 2002/0187780 A1 | 12/2002 | Souissi | |
| 2005/0135379 A1 | 6/2005 | Callaway, Jr. et al. | |
| 2006/0068795 A1 | 3/2006 | Caspi et al. | |
| 2007/0211681 A1 | 9/2007 | Sun et al. | |
| 2008/0068156 A1 | 3/2008 | Shimokawa et al. | |
| 2008/0129494 A1 | 6/2008 | Kim et al. | |
| 2009/0296652 A1 | 12/2009 | Rudowicz et al. | |
| 2010/0061272 A1 | 3/2010 | Veillette | |
| 2010/0069066 A1* | 3/2010 | Shen | H04J 11/0093 455/434 |
| 2010/0189011 A1 | 7/2010 | Jing et al. | |
| 2010/0248715 A1* | 9/2010 | Lundsgaard | H04W 48/16 455/432.1 |
| 2011/0149803 A1* | 6/2011 | McCormack | H04W 8/005 370/254 |
| 2012/0124367 A1 | 5/2012 | Ota et al. | |
| 2013/0165112 A1* | 6/2013 | Gopalsamy | H04W 8/02 455/432.1 |
| 2018/0317070 A1* | 11/2018 | Li | H04W 56/00 |
| 2019/0028886 A1* | 1/2019 | Deixler | H04W 8/186 |

* cited by examiner

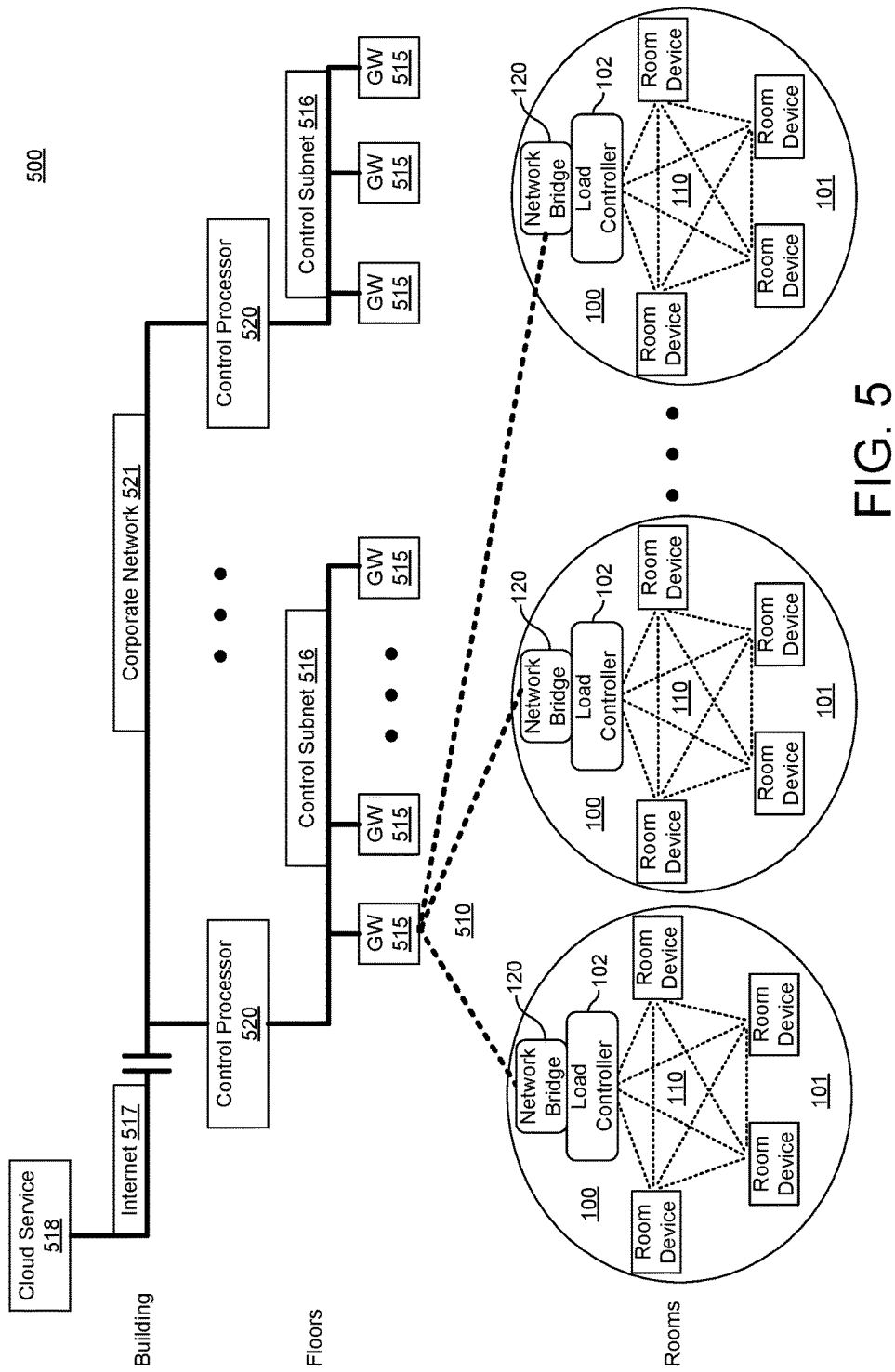

AUTOMATIC WIRELESS NETWORK FORMATION

BACKGROUND OF THE INVENTION

Technical Field

Aspects of the embodiments relate to wireless networks, and more specifically to systems, devices, and methods for automatically forming a wireless network.

Background Art

Control networks in homes and businesses are increasingly popular installations. A network of sensors and control devices distributed throughout a residential or commercial building may control and provide information for various elements of the building. For example, one or more control networks in a building may control and monitor lighting, heating, ventilation and air conditioning (HVAC), and audio-visual (AV) equipment.

Increasingly, these control networks comprise one or more personal area networks (PANs) organized in a wireless mesh topology in communication with other PANs and the control system using radio frequency (RF) signals. Generally, mesh networks allow each device to communicate with each other thereby providing multiple possible routes between nodes over which a packet can be routed. This is in contrast to traditional networks in which devices generally communicate through a master or a repeater. In mesh networks, each device is a node and may pass communications along to other devices. This increases both the reliability and range of the networks.

Communication protocols govern the operation of these wireless PANs by governing network formation, communication, interferences and other operational characteristics. For example, one such protocol is the Zigbee protocol from the Zigbee Alliance. Another wireless communication protocol is the infiNET EX protocol from Crestron Electronics, Inc. of Rockleigh, N.J. Based on ZigBee PRO technology, infiNET EX is an extremely reliable and affordable protocol that is employed by 2-way wireless wall box dimmers and switches, lamp dimmers and switches, plus thermostats and keypads, and other sensors and control devices.

A wireless mesh network device in a Zigbee or infiNET network may be assigned as the PAN coordinator. The PAN coordinator is the device which is responsible for starting the formation of a network. There is only one PAN coordinator in any network. The PAN coordinator chooses the PAN ID—a 16-bit value which is used to uniquely define a PAN.

Wireless mesh networks, such as Zigbee or infiNET networks, are formed by an initialization process. Typically, many of configuration properties may be preconfigured prior to initialization. By preconfiguring these properties, an administrator may determine the size and shape of the network. For example, the maximum number of links from the PAN coordinator to the furthest device may influence the shape and size of the network. The maximum number of devices that may connect to the PAN coordinator may also determine the shape and size of the network.

The PAN coordinator is responsible for initializing the wireless network. First, the PAN coordinator chooses a suitable radio channel on which to operate. Each RF network type divides the communication band into separate communication channels. For example, the infiNET EX network uses 802.15.4 channel mapping, which provides 16 channels numbered 11-26. Each channel is non-overlapping, which ensures that a device communicating on one channel cannot affect devices communicating on any other channels. Typically, the PAN coordinator selects the channel with the least amount of interference. Next, the PAN coordinator assigns a PAN ID to the network. The PAN ID can be pre-configured or alternatively can be chosen by detecting other networks operating in the same frequency channel and choosing a PAN ID that does not conflict with theirs. The PAN coordinator also assigns a network address to itself. Once the PAN coordinator is finished configuring itself, it starts itself in PAN coordinator mode. The PAN coordinator is then prepared to field queries from other devices wishing to join the network through a commissioning process. Some commissioning processes are accomplished through network planning (i.e., "acquire this device to this PAN coordinator"). Such commissioning may require manual human action at each subject device and the installer may decide how the devices should be interconnected. This can be subjective and error prone.

Other networks may be automatically formed using a conventional acquire process. Typically, a new device (i.e. node) scans available channels to find joinable wireless networks. The device then selects a discovered network by choosing a router or network coordinator on that network. Once this is done, the device sends a join message to the desired router or network coordinator, waits for a response, and attempts to join that network.

There are detractions from the conventional commissioning process. The problem is that it is an active process requiring the device to communicate with the PAN coordinator. This may create a substantial traffic and waste bandwidth when hundreds of devices attempt to join the wireless network. Crude methods for scanning and joining networks lead to sub-optimal networks, increased time to find the correct network, and sub-optimal configuration of the network upon joining.

Additionally, scan results often arrive in random order with no correlation to distance or suitability. Often a device will join the first network that it finds. This is less than optimal as the network may not be the desired network or may be an incompatible network. This may lead to a faulty communication link and a suboptimal network mesh. Because there is no order of results, the first networks found could be located much further away (and therefore less likely to be correct) than nearby networks. As the device attempts to join incorrect networks, the time necessary to join the correct network will increase.

Detecting the correct network to attempt to join is important for saving time and aggravation to the installer. Accordingly, a need has arisen for a better commissioning process which includes more robust measures to simplify, speedup, and improve the quality of wireless network formation.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for commissioning a wireless network that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to an aspect of the embodiments a wireless network joining device is provided comprising a personal area network (PAN) interface and a processor. The PAN interface is adapted to communicate with one or more network devices over a wireless network. The processor is adapted to direct the PAN interface to perform a number of active channel scans of a plurality of wireless communication channels for desired PANs to join by masking out channels in a desired network channel list. The processor updates the desired network channel list with channels containing desired PANs to join during each channel scan cycle. The processor also directs the PAN interface to listen for beacons on channels in the desired network channel list, wherein each beacon comprises PAN information. The processor receives PAN information included in heard beacons, selects a PAN to join based on the PAN information, and attempts to join the selected PAN.

According to an embodiment, the processor is further adapted to generate a pseudorandom scan count defining the number of channel scan cycles.

According to a further embodiment, upon finding a discoverable PAN during a channel scan cycle, the processor is further adapted to determine whether the found discoverable PAN is a desired PAN to join. According to one embodiment, each desired PAN may comprise an extended PAN ID, and upon finding the discoverable PAN, the processor receives a PAN ID and determines whether the found discoverable PAN is a desired PAN by determining whether the received PAN ID contains the extended PAN ID.

The processor may be further adapted to update a non-desired network channel list with channels containing non-desired PANs to join during each channel scan cycle. According to one embodiment, during each channel scan cycle the processor may be further adapted to mask out channels in the non-desired network channel list. According to another embodiment, the processor is adapted to mask out channels in the non-desired network channel list only during a prescaled number of channel scan cycles.

According to an embodiment, during a first channel scan cycle the desired network channel list is empty such that no channels are masked out from the first channel scan cycle. The desired network channel list may be cleared in response to at least one of a boot event, a reset event, a release event, a failure event, or any combinations thereof. According to an embodiment, the processor masks out channels during a given channel scan cycle based on a desired network channel list that was updated during a previous channel scan cycle.

According to an embodiment, the processor is further adapted to update a beacon-heard channel list with channels on which beacons were heard during each channel listen cycle. The processor may be further adapted to mask out channels in the beacon-heard channel list during each channel scan cycle. In addition, the processor may be adapted to direct the PAN interface to also listen for beacons on channels in the beacon-heard channel list during each channel listen cycle. According to an embodiment, during a first channel listen cycle the beacon-heard channel list is empty. According to a further embodiment, the processor directs the PAN interface to listen on channels during a given channel listen cycle based on a beacon-heard channel list that was updated during a previous channel listen cycle.

According to a further embodiment, the processor is adapted to generate network performance metric for each PAN for which a beacon was received based on PAN information contained in the received beacon. The processor may select a PAN to join according to the generated network performance metric. The processor may update a network result list with PANs with highest network performance metric. The processor may attempt to join each PAN in the network result list until a PAN is successfully joined or until there are no more PANs in the network result list to attempt to join. The network result list may comprise a maximum number of entries. The processor may attempt to join each PAN in the network result list in the order from highest to lowest network performance metric. According to an embodiment, a PAN to which the joining device has previously unsuccessfully attempted to join may be given a lower priority than a PAN to which the joining device has not previously attempted to join.

According to an embodiment, the PAN information comprises PAN identifying information and PAN performance information. The PAN identifying information may comprise at least one of a PAN ID, an extended PAN ID, a network device ID, a network RF channel, or any combinations thereof. The PAN performance information may comprise at least one of a received signal strength indicator (RSSI), a joined device count, a Link Quality Indicator (LQI), a number of beacons on a channel, a network device's measured RF energy, an over-the-air (OTA) messaging throughput, an RX throughput on a network device, an aggregate ALQI, a route cost, a hop count, a radius count, or any combinations thereof.

According to an embodiment, each beacon may comprise an out-of-band message. The beacon may further comprise a multi-cast secure raw message.

According to another aspect of the embodiments, a wireless network joining device is provided comprising a personal area network (PAN) interface and a processor. The PAN interface is adapted to communicate with one or more network devices over a wireless network. The processor is adapted to direct the PAN interface to perform a first active channel scan of a plurality of wireless communication channels for discoverable PANs. For each found discoverable PAN, the processor is further adapted to determine whether the discoverable PAN comprises a desired PAN to join. The processor is adapted to generate a desired PAN channel list comprising channels containing desired PANs and a non-desired PAN channel list comprising channels containing non-desired PANs. The processor is further adapted to direct the PAN interface to perform subsequent active channel scans for discoverable PANs by masking out the channels in the desired PAN channel list and the non-desired PAN channel list. The processor updates the desired PAN channel list and the non-desired PAN channel list during each subsequent active channel scan cycle. The processor further directs the PAN interface to listen on the channels in the desired PAN channel list for beacons, wherein each beacon comprises PAN information. The processor is further adapted to receive PAN information included in heard beacons, generate network performance metric for each PAN for which a beacon was received based on the PAN information contained in the received beacon, select a PAN according to the generated network performance metric, and attempt to join the selected PAN.

According to another aspect of the embodiments, a wireless network joining device is provided comprising a personal area network (PAN) interface and a processor. The PAN interface is adapted to communicate with one or more network devices over a wireless network. The processor is adapted to direct the PAN interface to perform a first active channel scan of a plurality of wireless communication channels for discoverable PANs. In response, the processor generates a first channel list comprising channels containing discoverable PANs. The processor further directs the PAN interface to perform subsequent active channel scans for discoverable PANs by masking out the channels in the first channel list. The processor update the first channel list with channels containing discoverable PANs during each subsequent channel scan cycle. The processor also directs the PAN interface to listen on the channels in the first channel list for beacons, wherein each beacon comprises PAN information. The processor further receives PAN information included in heard beacons, generates network performance metric for each PAN for which a beacon was received based on the PAN information contained in the received beacon, selects a PAN according to the generated network performance metric, and attempts to join the selected PAN.

According to a further aspect of the embodiments, a wireless network joining device is provided comprising a personal area network (PAN) interface and a processor. The PAN interface is adapted to communicate with one or more network devices over a wireless network. The processor is adapted to direct the PAN interface to perform a number of scan/listen cycles by (a) actively scanning a plurality of wireless communication channels for PANs by masking out channels in a scan channel mask, and (b) listening for beacons on channels in a listen channel list. During each scan/listen cycle, the processor is adapted to determine whether each found PAN comprises a desired PAN to join, dynamically update the scan channel mask with channels containing desired PANs, non-desired PANs, and channels on which beacons were heard, and dynamically update the listen channel list with channels containing desired PANs and channels on which beacons were heard. The processor further receives PAN information included in heard beacons, generates network performance metric for each PAN for which a beacon was received based on the PAN information contained in the received beacon, selects a PAN according to the generated network performance metric, and attempts to join the selected PAN.

According to another aspect of the embodiments, a wireless network system is provided. The system comprises at least one network coordinating device adapted to initialize a personal area network (PAN) and comprising a first PAN interface adapted to transmit at least one beacon comprising PAN information over a wireless communication channel. The system further comprises a network joining device comprising a second PAN interface and a processor. The second PAN interface is adapted to communicate with one or more network devices over a wireless network. The processor is adapted to direct the second PAN interface to perform a number of active channel scans of a plurality of wireless communication channels for desired PANs to join by masking out channels in a desired network channel list. The processor updates the desired network channel list with channels containing desired PANs to join during each channel scan cycle. The processor further directs the second PAN interface to listen for beacons on channels in the desired network channel list. The processor receives PAN information included in heard beacons, selects a PAN to join based on the PAN information, and attempts to join the selected PAN.

According to another aspect of the embodiments, a method for joining a personal area network (PAN) is provided comprising the steps of: (i) performing a number of active channel scans of a plurality of wireless communication channels for desired PANs to join by masking out channels in a desired network channel list; (ii) updating the desired network channel list with channels containing desired PANs to join during each channel scan cycle; (iii) listening for beacons on channels in the desired network channel list, wherein each beacon comprises PAN information; (iv) receiving PAN information included in heard beacons; (v) selecting a PAN to join based on the PAN information; and (vi) attempting to join the selected PAN.

According yet to another aspect of the embodiments a method for joining a personal area network (PAN) is provided comprising the steps of: (i) performing a first active channel scan of a plurality of wireless communication channels for discoverable PANs; (ii) generating a first channel list comprising channels containing discoverable PANs; (iii) performing subsequent active channel scans for discoverable PANs by masking out the channels in the first channel list; (iv) updating the first channel list with channels containing discoverable PANs during each subsequent channel scan cycle; (v) listening on the channels in the first channel list for beacons, wherein each beacon comprises PAN information; (vi) receiving PAN information included in heard beacons; (vii) generating network performance metric for each PAN for which a beacon was received based on the PAN information contained in the received beacon; (viii) selecting a PAN according to the generated network performance metric; and (ix) attempting to join the selected PAN.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
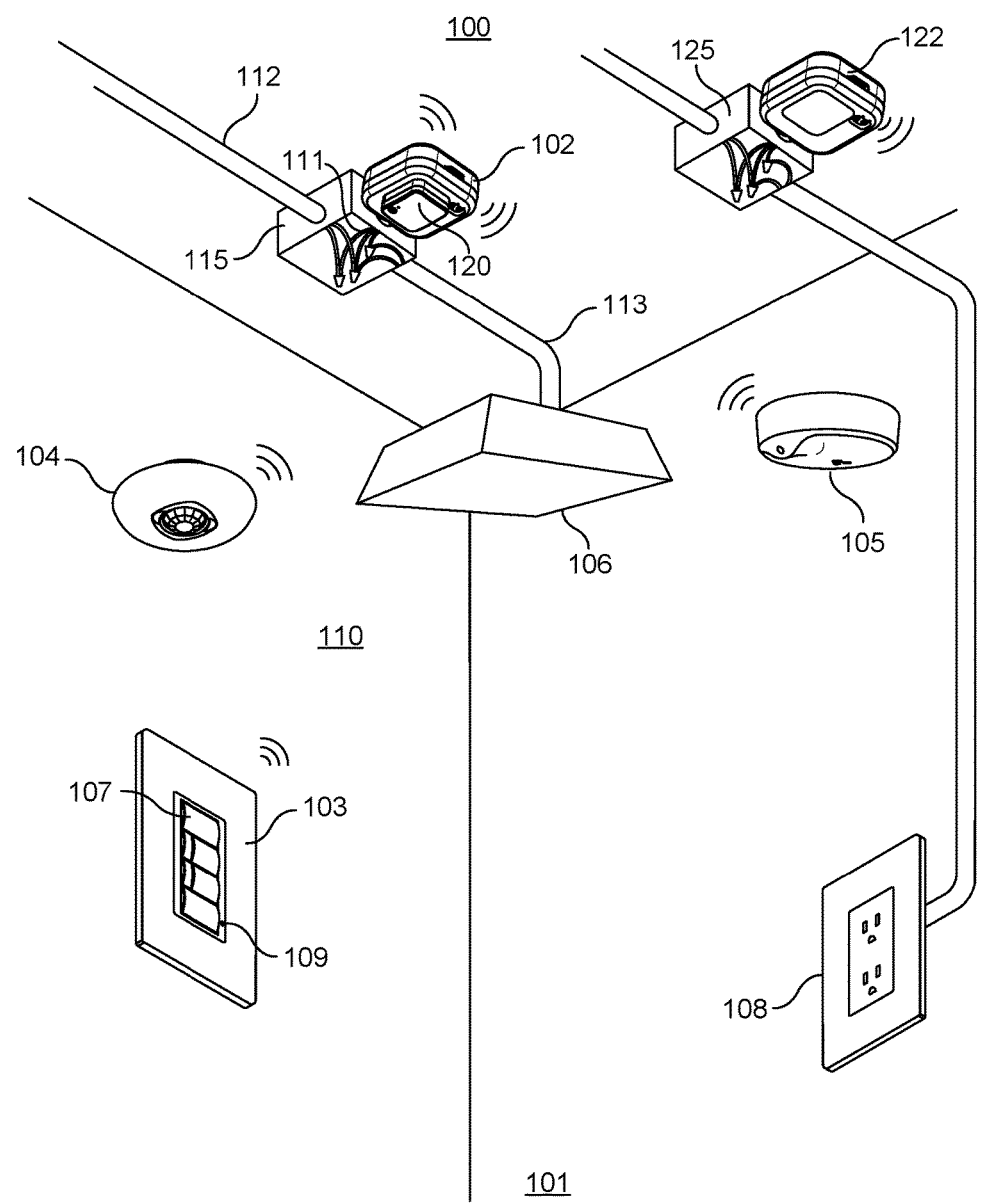

FIG. 1 illustrates a room lighting control system according to an illustrative aspect of the embodiments.

Figure 2:
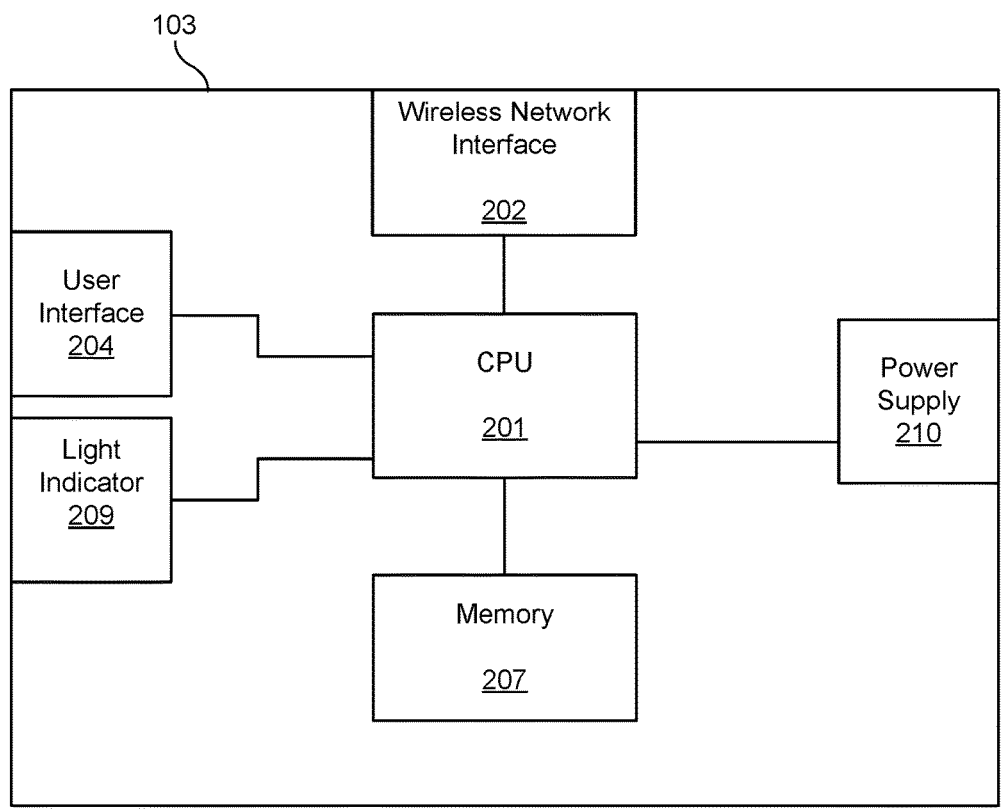

FIG. 2 is an illustrative block diagram of a lighting control device according to an illustrative aspect of the embodiments.

Figure 3:
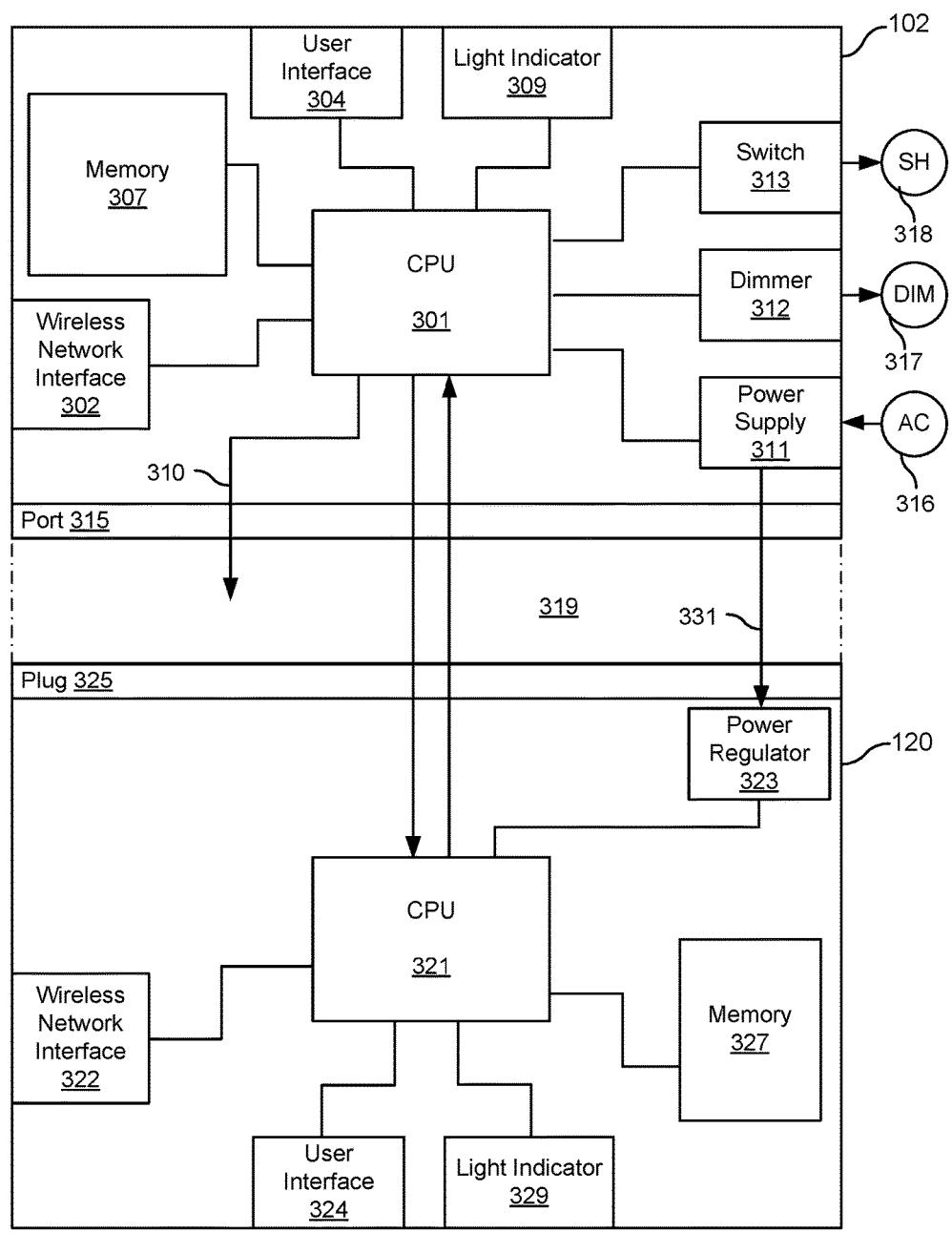

FIG. 3 is an illustrative block diagram of a load controller and a network bridge according to an illustrative aspect of the embodiments.

Figure 4A:
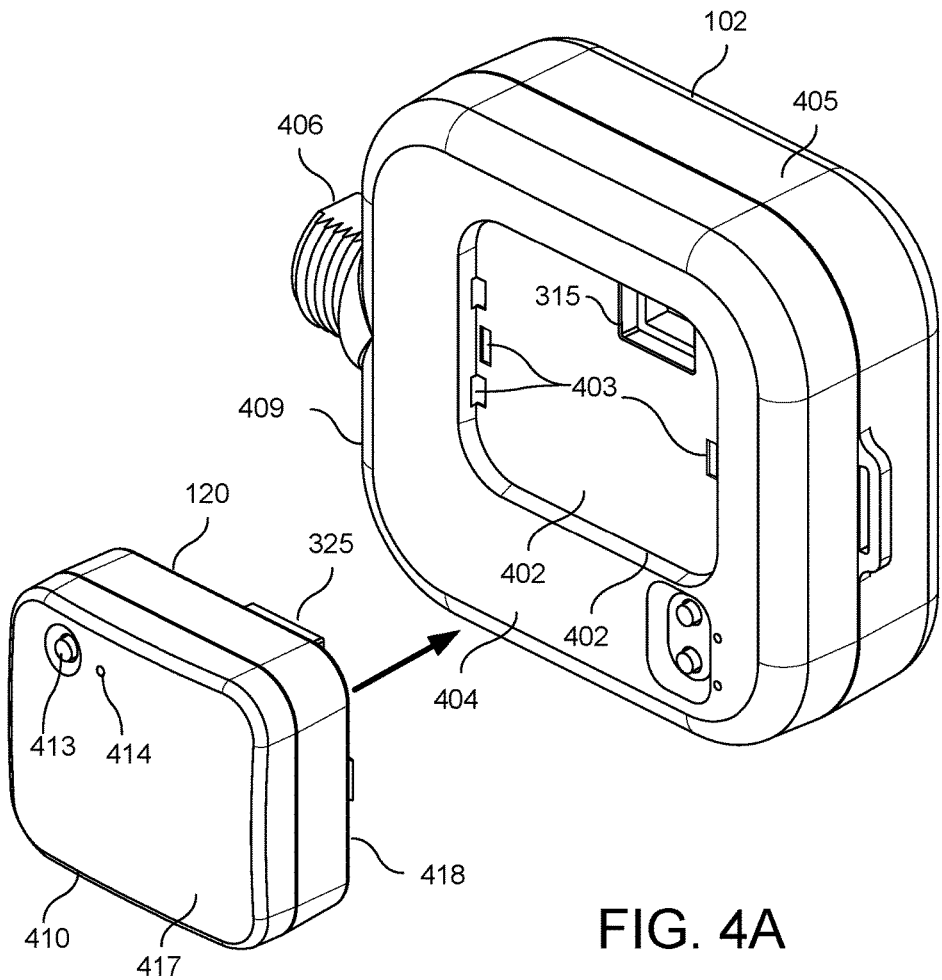

FIG. 4A illustrates a perspective front view of the load controller and the network bridge according to an illustrative aspect of the embodiments.

Figure 4B:
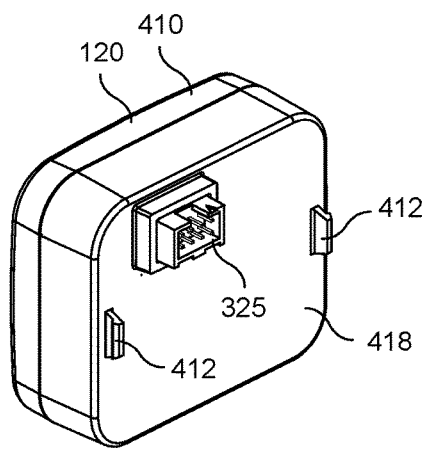

FIG. 4B illustrates a perspective rear view of the network bridge according to an illustrative aspect of the embodiments.

FIG. 5 is an illustrative block diagram of a centralized lighting control system according to an illustrative aspect of the embodiments.

Figure 6:
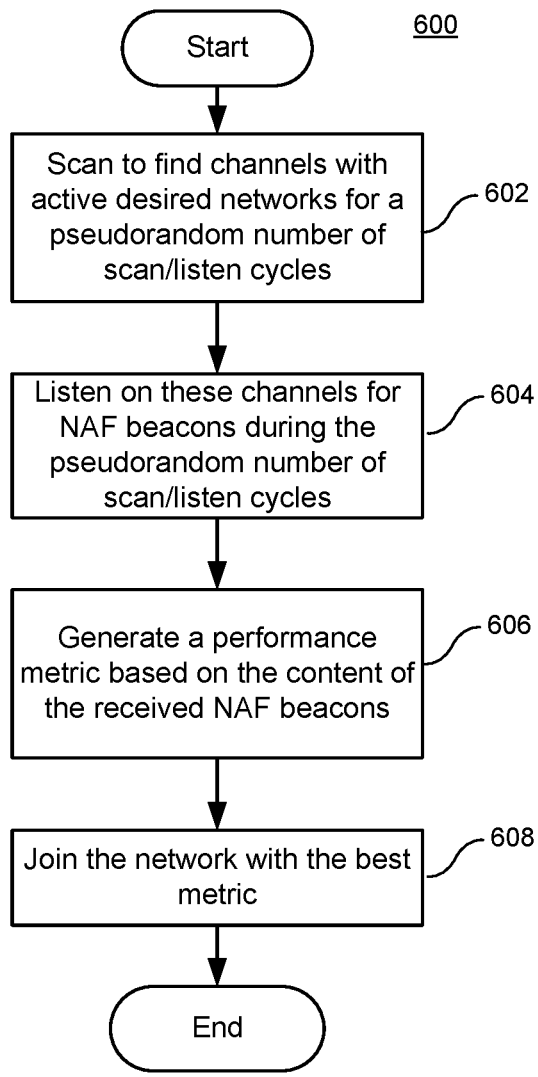

FIG. 6 show a flowchart illustrating the main steps of the network auto-formation (NAF) process according to an illustrative aspect of the embodiments.

Figure 7A:
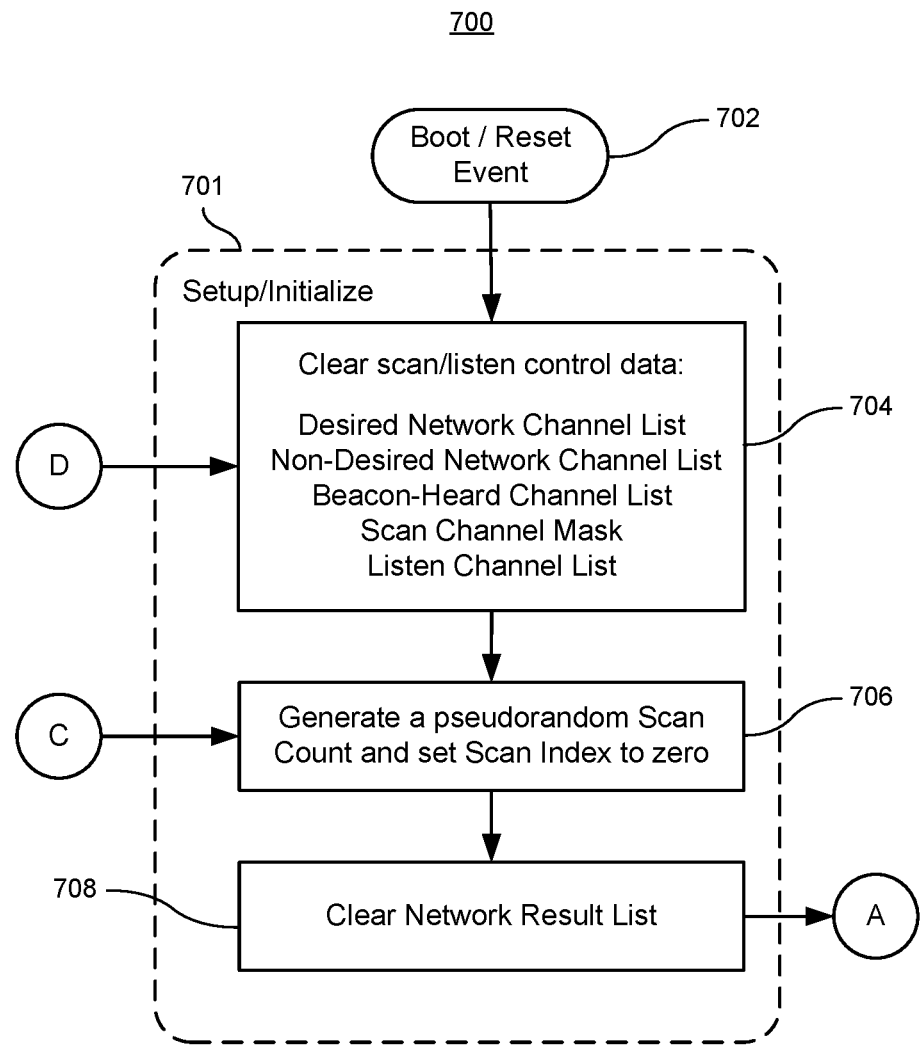
Figure 7B:
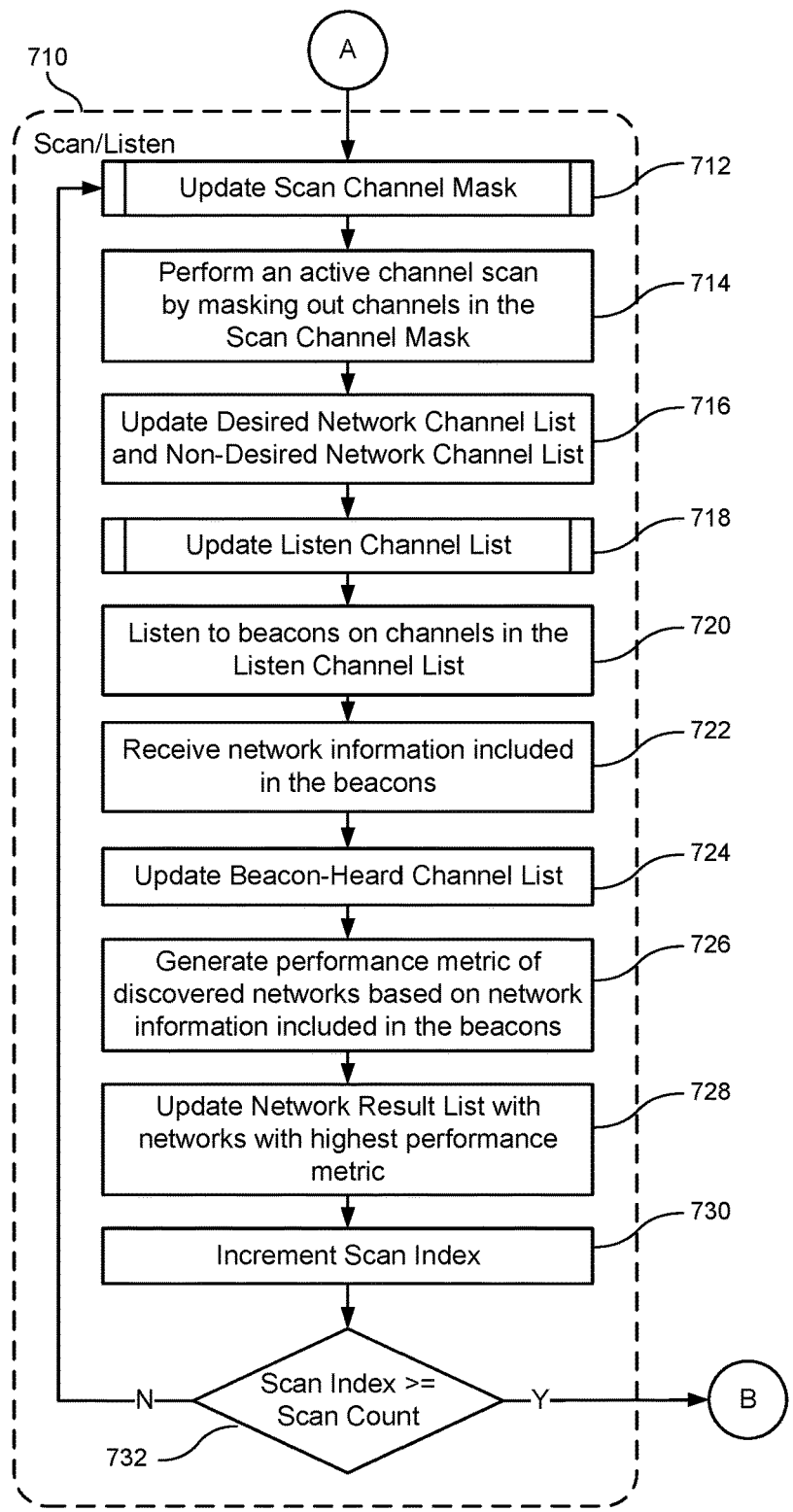
Figure 7C:
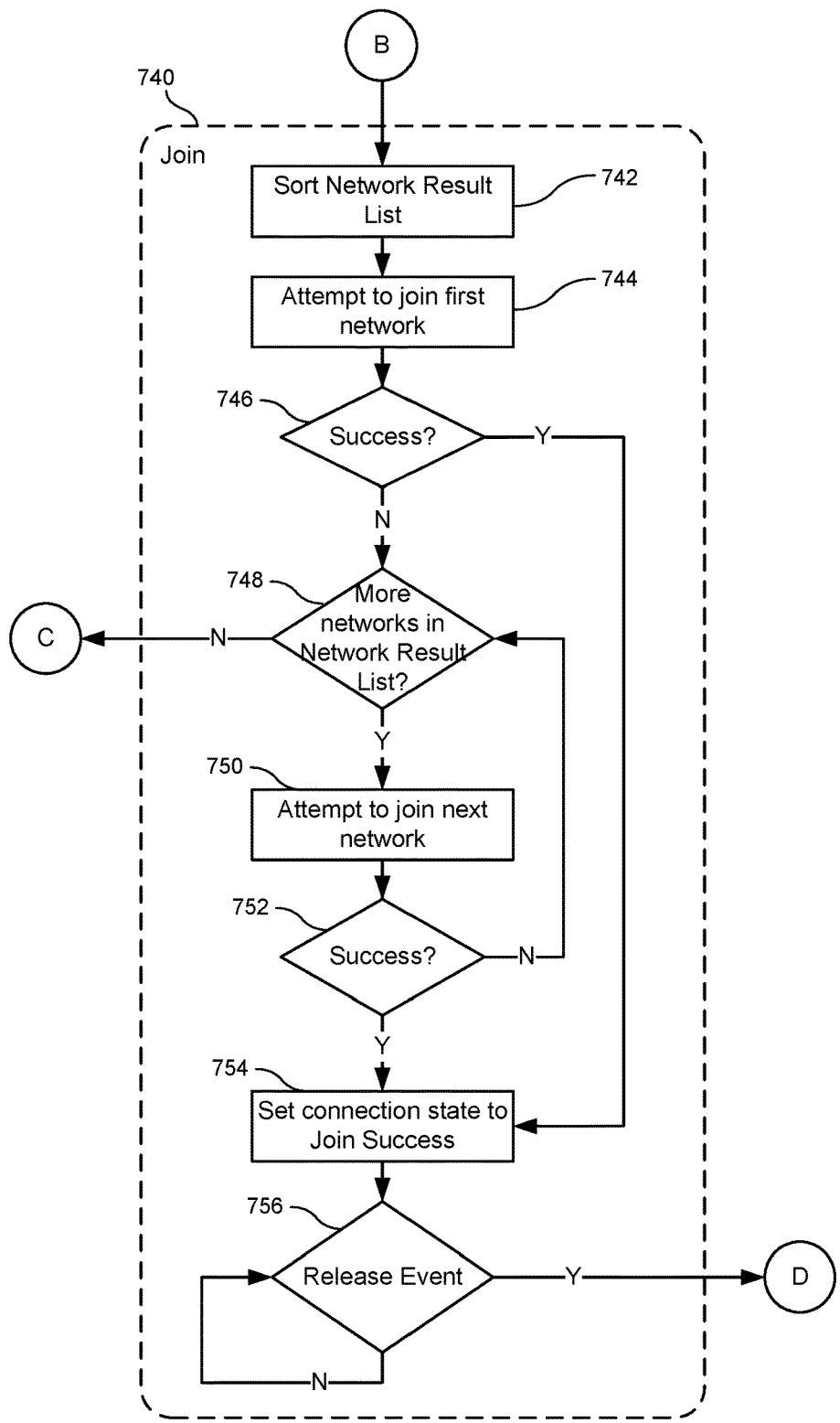

FIGS. 7A-7C show a flowchart illustrating the NAF process in a greater detail according to an illustrative aspect of the embodiments.

Figure 8:
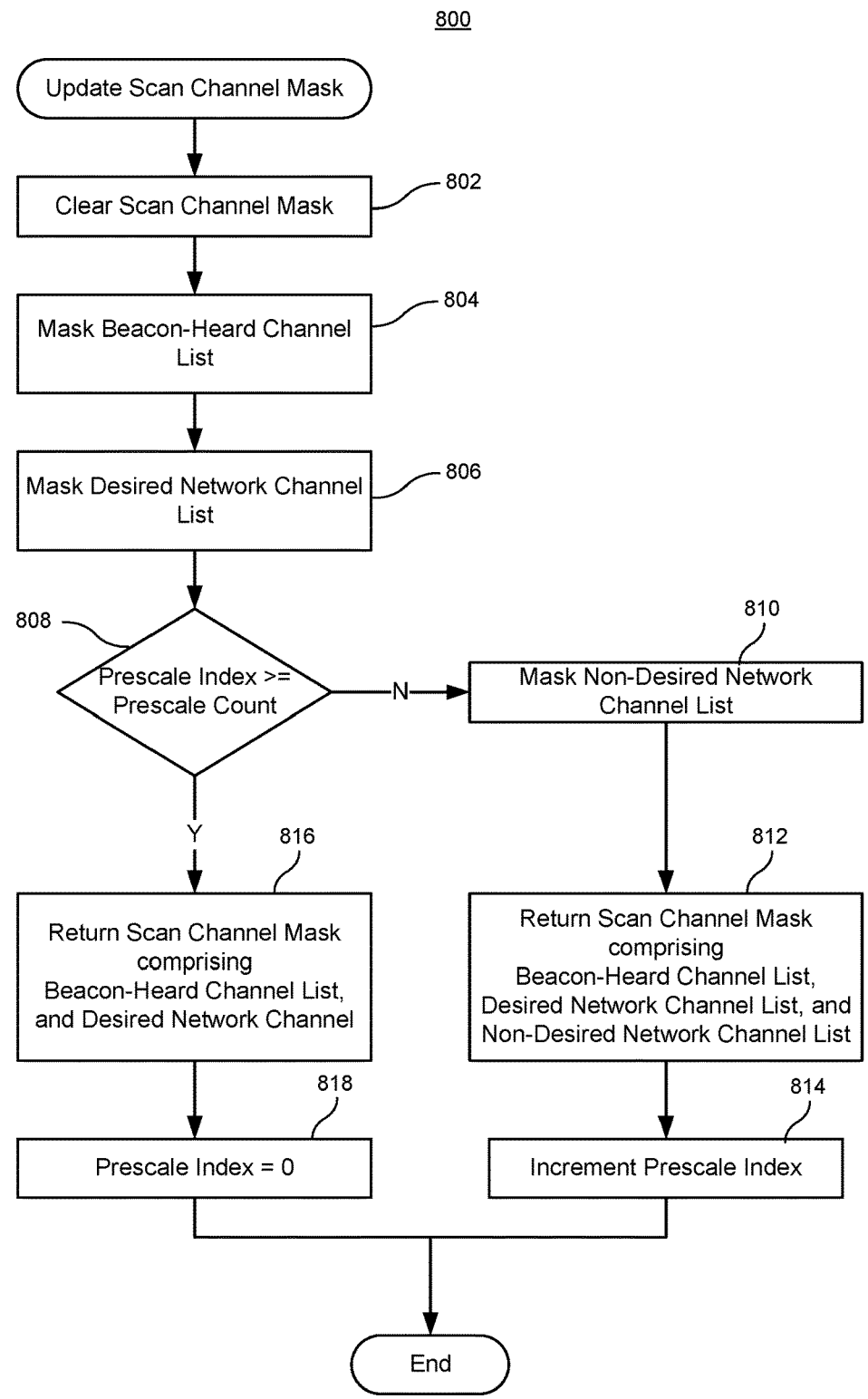

FIG. 8 shows a flowchart illustrating the process for updating the Scan Channel Mask according to an illustrative aspect of the embodiments.

Figure 9:
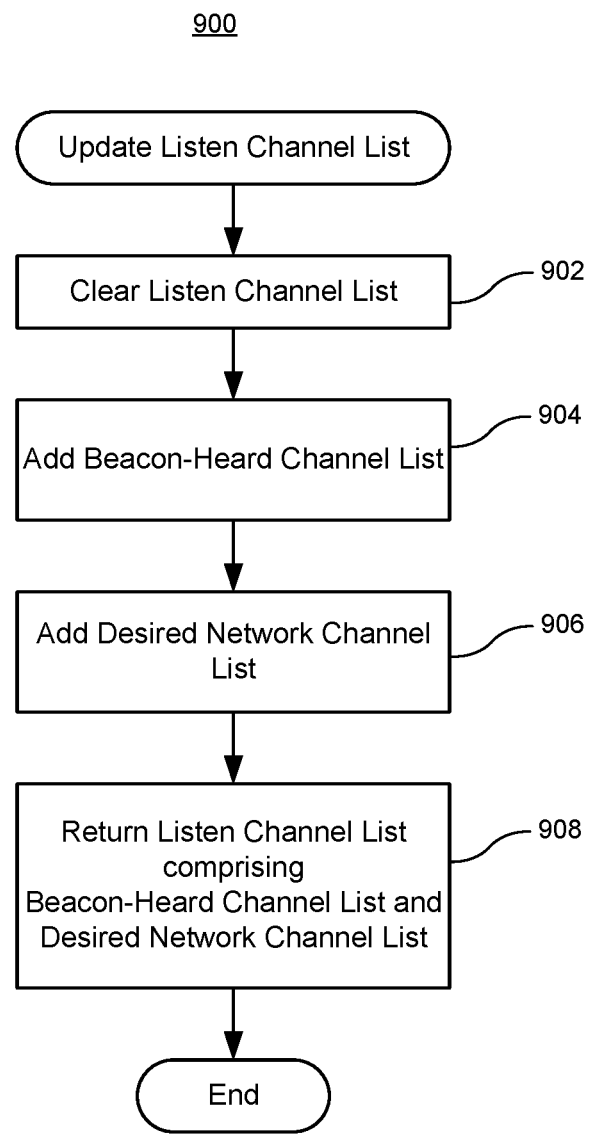

FIG. 9 shows a flowchart illustrating the process for updating the Listen Channel List according to an illustrative aspect of the embodiments.

Figure 10:
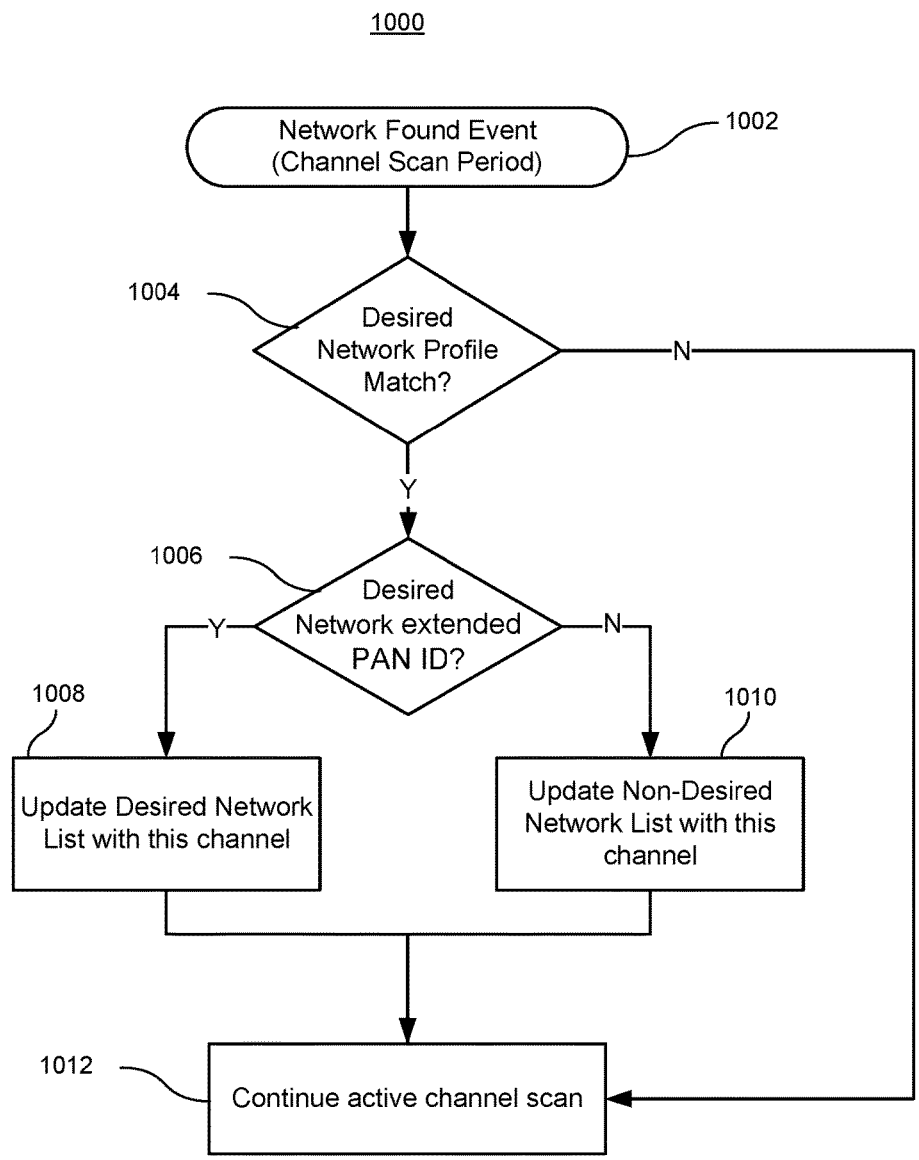

FIG. 10 shows a flowchart illustrating the process of updating the Desired Network List and the Non-Desired Network List during the channel scan period according to an illustrative aspect of the embodiments.

Figure 11:
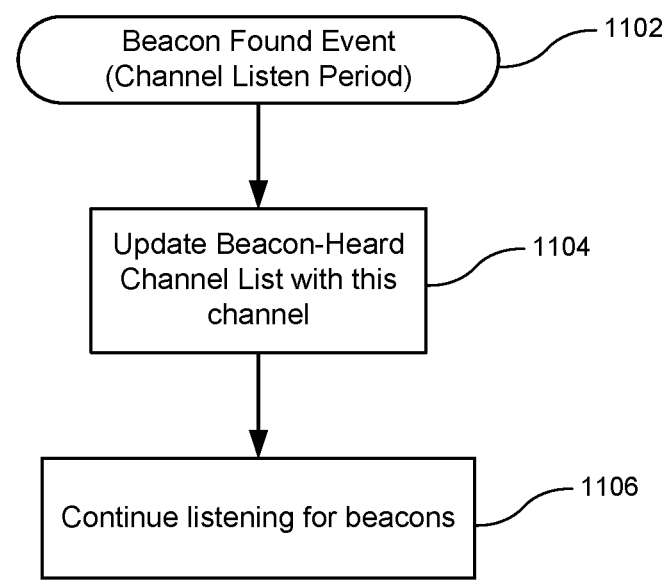

FIG. 11 shows a flowchart illustrating the process of updating the Beacon-Heard Channel List during the channel listen period according to an illustrative aspect of the embodiments.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Room Lighting Control System(s)
101 Room(s)
102 Load Controller(s)
103 Lighting Control Device(s)
104 Occupancy Sensor(s)
105 Light Sensor(s)
106 Lighting Load(s)
107 Buttons
108 Receptacle(s)
109 Light Emitting Diode (LED)
110 Room Wireless Network
111 Wire Leads
112 Voltage Line
113 Load Line
115 Junction Box
120 Network Bridge(s)
122 Load Controller
125 Junction Box
201 Central Processing Unit (CPU)
202 Wireless Network Interface
204 User Interface
207 Memory
209 Status Light Indicator
210 Power Supply
301 Central Processing Unit (CPU)
302 Wireless Network Interface
304 User Interface
307 Memory
309 Status Light Indicator
310 General Purpose Input Output (GPIO)
311 Power Supply
312 Dimmer
313 Switch
315 Port
316 Alternating Current (AC) Power Signal
317 Dimmed Voltage Output Signal
318 Switched Hot Signal
319 Bridge Interface
321 Central Processing Unit (CPU)
322 Wireless Network Interface
323 Power Regulator
324 User Interface
325 Plug
327 Memory
329 Status Light Indicator
331 Power Signal
402 Recess
403 Cavities
404 Front Surface
405 Housing
406 Threaded Nipple
409 Side Surfaces
410 Housing
412 Hooks
413 Button
414 LEDs
417 Front Surface
418 Rear Surface
500 Centralized Lighting Control System
510 Centralized Wireless Network
515 Wireless Gateway(s)
516 Control Subnet(s)
517 Internet
518 Cloud Service/Server
520 Control Processor(s)
521 Corporate Network
600 Flowchart illustrating the main steps of the Network Auto-Formation (NAF) process
602-608 Steps of Flowchart 600

700 Flowchart illustrating the NAF process in a greater detail
701 Setup/Initialize Process Cycle
702-708 Steps of the Setup/Initialize Process Cycle
710 Scan/Listen Process Cycle
712-732 Steps of the Scan/Listen Process Cycle
740 Join Process Cycle
742-756 Steps of the Join Process Cycle
800 Flowchart illustrating the process for updating the Scan Channel Mask
802-818 Steps of Flowchart 800
900 Flowchart illustrating the process of updating the Listen Channel List
902-908 Steps of Flowchart 900
1000 Flowchart illustrating the process of updating the Desired Network List and the Non-Desired Network List during the channel scan period
1002-1012 Steps of Flowchart 1000
1100 Flowchart illustrating the steps of updating the Beacon-Heard Channel List during the channel listen period
1102-1106 Steps of Flowchart 1100

LIST OF ACRONYMS USED IN THE SPECIFICATION IN ALPHABETICAL ORDER

The following is a list of the acronyms used in the specification in alphabetical order.
AC Alternating Current
ALQI Aggregate Link Quality Indicator
ASIC Application Specific Integrated Circuit
AV Audiovisual
BAS Building Automation System
BMS Building Management System
CCO Contact Closure Output
CPU Central Processing Unit
DC Direct Current
EMS Energy Management System
GHz Gigahertz
GPIO General-Purpose Input/Output
HVAC Heating, Ventilation and Air Conditioning
Hz Hertz
ID Identification
IP Internet Protocol
LAN Local Area Network
LED Light Emitting Diode
LQI Link Quality Indicator
mA Milliamps
NAF Network Auto-Formation (Wireless Automatic Network Formation)
OTA Over-The-Air
PAN Wireless Personal Area Network
PC Personal Computer
RAM Random-Access Memory
RF Radio Frequency
RISC Reduced Instruction Set
ROM Read-Only Memory
RSSI Received Signal Strength Indicator
RX Reception
SPI Serial Peripheral Interface
SSR Solid-State Relay
TRIAC Triode for Alternating Current
TX Transmission
USB Universal Serial Bus
V Volt

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics Inc., located in Rockleigh, N.J., and have been marketed under the trademark name of Zūm.

The different aspects of the embodiments described herein pertain to the context of wireless networks. These wireless networks may be used in building control systems, including building automation systems (BAS), building management systems (BMS), and energy management systems (EMS), but are not limited thereto, except as may be set forth expressly in the appended claims. However, the wireless network formation process discussed herein may be used in other types of systems. In addition, the embodiments of the building management system can be used in small, mid, or large scale residential or commercial installations. While the embodiments are described herein as being implemented for commercial building management, they are not limited to such an implementation. The present embodiments may be employed in other type of venues or facilities, including in residential, retail, or nonprofit structures or venues. Additionally, the building control system described herein may manage and control an entire building and can be scaled up to manage an entire campus of buildings or scaled down to manage a single room, a floor, or a section of a floor, such as a department. Additionally, while the building control system of the present embodiments is described below as monitoring and controlling lighting, the building control system can monitor and control numerous other types of electronic devices, including one or more of heating, ventilation and air conditioning (HVAC), shading, security, appliances, door locks, and audiovisual (AV) equipment, among others.

Referring to FIG. 1, there is shown a room lighting control system 100 according to one embodiment. The room lighting control system 100 may also be referred to as a zone or a space lighting control system 100. According to an embodiment, the lighting control system 100 can operate as a room-based, standalone system. Lighting control system 100 may be installed in a room 101 and may comprise one or more of the following devices: one or more load controllers 102 and 122, a lighting control device 103, a receptacle 108, an occupancy sensor 104, a light sensor 105, as well as other lighting control devices. The lighting control system 100 may be installed in an office, classroom, conference room, residential room, or the like. The lighting control system 100 may be configured to control one or more lighting loads 106 within room 101 over a room or zone based wireless network 110. A network bridge 120 may be optionally installed in the room lighting control system 100, either during initial installation or anytime at a later date, for scaling up the room lighting control system 100 to a centralized lighting control system for entire building control.

One or more lighting control devices 103 may be installed in room 101. The lighting control device 103 is configured to serve as a user interface to associated load controllers 102 in a space. In an illustrative embodiment, the lighting control device 103 may be configured to receive control commands directly from a user and wirelessly transmit the control commands to the load controller 102 electrically connected the lighting load 106 to control the lighting load 106 based on the control commands.

The lighting control device 103 may be configured as a switch, a dimmer, a keypad, or another device configured for receiving control commands from a user. A light switch can be used to control the on/off state of the lighting load 106. A dimmer may be configured to control the on/off state of the lighting load 106 as well as to control a dimming level of the load 106. A keypad, such as the lighting control device 103 illustrated in FIG. 1, may comprise a plurality of buttons 107. The buttons 107 may correspond to different lighting scenes, such as a day scene and a night scene, with different dimming modes that may be preconfigured by the user. The buttons 107 may also be configured to control multiple load devices, such as a plurality of lighting loads 106, as well as other type of loads such as shade or drapery devices, heating, ventilation and air conditioning (HVAC) systems, audiovisual (AV) devices, or the like.

FIG. 2 is an illustrative block diagram of a lighting control device 103. The control device 103 may include various circuit components configured for receiving control commands and transmitting commands wirelessly to a load controller 102, or other in-room devices. Lighting control device 103 may comprise a power supply 210 configured for providing power to the various circuit components of the lighting control device 103. In one embodiment, the lighting control device 103 may be battery operated, for example, via a coin cell battery, such as a BR2032 coin cell battery. As such, the battery powered lighting control device 103 may be attached to any vertical surface, such as a wall, glass, sheetrock, or the like, with tape or mounting adhesive, without the need of a mounting box, wires, or cutouts. The battery powered lighting control device 103 may be also installed to a switch or gang box using screws. In one embodiment, the battery powered lighting control device 103 may comprise similar configuration to the battery powered control device disclosed in U.S. patent application Ser. No. 15/342,639, filed Nov. 3, 2016, and titled "Battery Powered Keypad Assembly," the entire contents of which are hereby incorporated by reference.

In another embodiment, for applications where a battery powered unit is not practical or desired, such as retrofit applications, one or more of the lighting control devices 103 may be powered by an electric alternating current (AC) power signal from an AC mains power source. Such lighting control device 103 may comprise leads suitable for making line voltage connection. The AC powered lighting control device 103 may be installed in a standard switch or gang box using screws. According to an embodiment, such AC powered control devices 103 may not directly control a lighting load 106, but send control commands to a paired load controller 102 via the room wireless network 110. In other embodiments, one or more of the AC powered control devices 103 may be directly wired and control a load within room 101.

The lighting control device 103 may comprise a user interface 204, such one or more buttons 107 (FIG. 1) in communication with micro-switches or tactile switches, through which the lighting control device 103 may receive control commands from a user to control an operation of a load, such as turn the load on or off, increase or decrease light levels of the load, recall a preset setting, or the like. These control commands may be transmitted to the load controller 102 over the room wireless network 110 to control its associated lighting load 106. The buttons 107 may also be used to disable or enable operation of the occupancy sensor 104 or the light sensor 105 in the room. The buttons 107 on the lighting control device 103 may be also used for configuration purposes, such as to command the lighting control device 103 to join a network, bind the lighting control device 103 to other in-room devices, group the lighting control device 103 into a group of in-room devices, enter into a scene setting mode to configure preset lighting scenes, or the like.

The lighting control device 103 may also comprise at least one status light indicator 209, such as a multicolored light emitting diode (LED) 109 (FIG. 1), configured for visually indicating the status of the lighting control device 103 to the user. For example, if a button 107 is pressed, the light indicator 209 may briefly light green. If the battery level is low (e.g., <5% life remaining) the light indicator 209 may blink red three times. The light indicator 209 may also indicate whether the control device 103 is trying to join a network, when it is configured, or the like. Additional status light indicators may also be provided, for example, to identify active switches or dimming levels.

Each lighting control device 103 can further comprise a central processing unit (CPU) 201. CPU 201 can represent one or more microprocessors, and the microprocessors can be "general purpose" microprocessors, a combination of general and special purpose microprocessors, or application specific integrated circuits (ASICs). Additionally, or alternatively, the CPU 201 can include one or more reduced instruction set (RISC) processors, video processors, or related chip sets. The CPU 201 can provide processing capability to execute an operating system, run various applications, and/or provide processing for one or more of the techniques and functions described herein. CPU 201 can process various commands and perform operations requested by the load controller 102, such as allowing the lighting control device 103 to join the room based wireless network 110, receiving and processing user control commands, determining battery voltage levels, or the like.

Each lighting control device 103 can further include a memory 207 communicably coupled to the CPU 201, which can store data and executable code. Memory 207 can represent volatile memory such as random-access memory (RAM), and/or nonvolatile memory, such as read-only memory (ROM) or Flash memory. In buffering or caching data related to operations of the CPU 201, memory 207 can store data associated with applications running on the control processor 201. Memory 207 can store data files, software for implementing the functions on the control processor 201, and wireless connection information to establish the wireless network 110.

Each lighting control device 103 may comprise a wireless network interface 202 configured for bidirectional wireless communication with other in-room devices, such as the load controller 102, on the room based wireless network 110. According to an embodiment, the wireless network interface 202 may comprise a personal area network (PAN) interface, such as a radio frequency (RF) transceiver configured for bidirectional wireless communication over a 2.4 GHz wireless network.

Referring back to FIG. 1, system 100 may further comprise sensors, such as an occupancy sensor 104 and a light sensor 105, which may also be referred to as lighting control devices. Sensors 104-105 may comprise similar components as shown in FIG. 2, including a wireless network interface 202, a CPU 201, and a memory 207. Sensors 104-105 may comprise a power supply 210 and may be battery operated or connected to line voltage. Sensors 104-105 may also comprise a user interface 204, such as one or more buttons, configured for commanding the sensors 104-105 to enter into a test mode, battery check, network joining mode, commissioning mode, configuration mode, such as calibration mode, adjusting sensitivity, adjusting timeout, or the like. Sensors 104-105 may further comprise light indicators 209, such as one or more light emitting diodes (LEDs), to display a status of the sensors 104-105. For example, the light indicator 209 may indicate when the sensor is trying to join a network, when it is configured, when motion is detected, when a battery is low, or the like.

An occupancy sensor 104 detects the occupancy state of the room 101 and generates an occupancy signal based on the occupancy state of that monitored area. The load controller 102 may turn lights on when the room is occupied and turn them off when the room is vacant. A light sensor 105 may be configured for detecting and measuring natural light intensities in the room 101 to enable daylight harvesting applications. Light sensor 105 may monitor natural daylight from windows and communicate the detected light intensity to the load controller 102. The load controller 102 may raise or lower the lighting load 106 according to natural light fluctuations, reducing energy usage while maintaining a consistent light level for a more efficient and comfortable work or living space. The lighting control system 100 may further comprise other types of sensors, such as infrared sensors, photosensors, ultrasonic sensors, various motion sensors, occupancy sensors, proximity sensors, sound sensors, microphones, ambient temperature sensors, or the like.

The lighting control system 100 may further comprise one or more load or zone controllers 102 and 122 installed in the room 101. Load controller 102 may receive control messages from in-room devices, such as the lighting control device 103, occupancy sensor 104, and light sensor 105 in the room lighting control system 100 to control its associated lighting load 106. The lighting control system 100 may comprise one or a plurality of load controllers, such as load controllers 102 and 122, connected to respective loads within room 101. Each load controller 102 may be grouped with particular control devices 103, occupancy sensors 104, and light sensors 105 located within room 101.

Each load controller 102 may be mounted to a conventional four-inch junction box 115 in the ceiling via a conduit knockout and may comprise a plurality of wire leads 111 extending into the junction box 115. The load controller 102 may comprise a hot wire and a neutral wire connected via a voltage line 112 to an alternating current (AC) power source, such as an AC mains power source, to receive electric AC power signal. In an embodiment, the AC power source may comprise 120 Volt (V) 60 Hertz (Hz) AC mains residential power supply. In other embodiments, the AC power source may supply power at a different voltage and/or frequency. For example, in another embodiment, the AC power source may supply 220V 50 Hz AC mains power supply. The load controller 102 may be further connected to a lighting load 106 via load line 113 to control the lighting load 106 in response to messages received from in-room devices, such as the lighting control device 103, occupancy sensor 104, and light sensor 105.

In an alternative embodiment, instead of using a hard wired configuration, the load controller 102 may comprise a plug-in configuration. The load controller 102 may comprise a plug for connection to a wall receptacle to receive electric AC power signal from an AC power source. Additionally, the load controller 102 may comprise a receptacle for receiving a plug from a lighting load 106.

In various embodiments, the load controller may be connected to control the operation of other types of loads, including HVAC, shading, security, appliances, door locks, AV equipment, among others. For example, load controller 122, with similar configuration to load controller 102, may be electrically connected to a receptacle 108 via junction box 125 to power the receptacle 108 on or off. Certain building codes require certain percentage of receptacles to be switched off when the room is unoccupied. The load controller 122 connected to the receptacle 108 may turn off power to the receptacle 108 when the room 101 becomes vacant and turn back on when the room 101 becomes occupied, as reported by the occupancy sensor 104. Load controller 122 may transmit its status information to the network manager, such as load controller 102.

FIG. 3 is an illustrative block diagram of a load controller 102 (including load controller 122). The load controller 102 may include various circuit components configured for receiving commands and transmitting commands wirelessly to various in-room devices, such as other load controllers, the lighting control device 103, occupancy sensor 104, and light sensor 105. The load controller 102 may comprise a power supply 311 connected to the voltage line 112 for receiving an electric AC power signal 316 from an AC mains power source. The power supply 311 may comprise circuit components configured for converting the incoming AC power signal to a direct current (DC) power signal. For example, the power supply 311 may comprise a bridge rectifier that rectifies the AC voltage signal and converts it into a rectified DC voltage signal. The bridge rectifier may comprise four or more diodes in a bridge circuit configuration which provides the same polarity output for either polarity input of the AC signal. The power supply 311 may also comprise a power regulator configured for maintaining a substantially constant voltage level to stabilize the DC voltage signal used by the circuit elements of the load controller 102.

The load controller 102 may comprise a user interface 304, such one or more buttons, configured for commanding the load controller 102 to enter into a test mode, a setup mode, or the like. For example, the buttons may be used to command the load controller 102 to form the room wireless network 110 or join an existing room wireless network 110. The load controller 102 may further comprise a status light indicator 309, such as one or more LEDs, for use during setup, maintenance, troubleshooting, or the like. For example, the status light indicator 309 can indicate the current state of the lighting load 106.

The load controller 102 can further comprise a CPU 301. CPU 301 can represent one or more microprocessors, and the microprocessors can be "general purpose" microprocessors, a combination of general and special purpose microprocessors, or ASICs. Additionally, or alternatively, the CPU 301 can include one or more RISC processors, video processors, or related chip sets. The CPU 301 can provide processing capability to execute an operating system, run various applications, and/or provide processing for one or more of the techniques and functions described herein. CPU 301 can process various commands and perform operations in response to messages received from in-room devices to control the lighting load 106.

The load controller 102 can further include a memory 307 communicably coupled to the CPU 301, which can store data and executable code. Memory 307 can represent volatile memory such as RAM, but can also include nonvolatile memory, such as ROM or Flash memory. In buffering or caching data related to operations of the CPU 301, the memory 307 can store data associated with applications running on the control processor 301. Memory 307 can store data files, software for implementing the functions on the control processor 301, and wireless connection information to establish the wireless network 110.

The load controller 102 may further comprise a wireless network interface 302 configured for bidirectional wireless communication with other in-room electronic devices, such as the lighting control devices 103 and light sensors 104, over the room based wireless network 110. The wireless network interface 302 may comprise a radio frequency (RF) transceiver configured for bidirectional wireless communication over a 2.4 GHz wireless network.

The load controller 102 may be a dimming load controller and/or a switching load controller. The load controller may comprise a switch 313 configured for switching a connected lighting load 106, or other load type, on or off by providing a switched hot signal 318 to the load. According to one embodiment, switch 313 may comprise an electromechanical relay configured for switching the lighting load 106 on or off. An electromechanical relay may use an electromagnet to mechanically operate a switch. In another embodiment, a solid-state relay (SSR) may be used to switch the lighting load 106 on or off. The SSR may comprise semiconductor devices, such as thyristors (e.g., TRIAC) and transistors, to switch currents up or down.

In addition, or alternatively, the load controller 102 may comprise a dimmer 312 configured for providing a dimmed voltage output signal 317 to a connected lighting load 106. For example, the dimmer 312 of the load controller 102 may reduce its output based on sunlight levels reported by the light sensor 104. According to an embodiment, the dimmer 312 may comprise a solid-state dimmer for dimming different types of lighting loads 106, including incandescent, fluorescent, LED, or the like. According to an embodiment, the dimmer 312 may comprise a 0-10V DC dimmer to provide a dimmed voltage output to an LED lighting load, a fluorescent lighting load, or the like. In one embodiment, the dimmer 312 may comprise the sinking and sourcing dimmer circuit disclosed in U.S. patent application Ser. No. 15/336,381, filed Oct. 27, 2016, and titled "Dimmer Configured for Providing Sinking and Sourcing, Current Outputs," the entire contents of which are hereby incorporated by reference.

The load controller 102 may further comprise a port 315, such as a Serial Peripheral Interface (SPI) port, a Universal Serial Bus (USB) port, or the like. Port 315 may be configured for connecting the load controller 102 to a network bridge 120 as will be further described below.

In another embodiment, the port 315 may be used to connect the load controller 102 to other types of systems. The port 315 may comprise a general-purpose input/output (GPIO) generic pin 310 configured for connecting the load controller 102 to other types of systems. For example, the GPIO pin 310 may be used to connect the load controller 102 to a relay module, such as a Contact Closure Output (CCO) relay module. The relay module may plug into the port 315 on any load controller the same way as discussed below with respect to the network bridge 120. The relay module may be used to provide control commands to other type of building equipment, such as an HVAC controller. The relay module may provide an optional contact closure interface to inform other system of the state of the room 101, i.e., occupied or vacant. This may be used to enable or disable HVAC in the room. For example, the load controller 102 may drive the relay module on when it receives an occupied state and drive the relay module off when it receives a vacant state based on the reported occupancy sensor state.

In another embodiment, the GPIO pin 310 may be used to connect the load controller 102 to an Audiovisual (AV) bridge to enable interactions between an AV system and the room control system 100. The AV bridge may comprise an interface for communication to an AV system, such as an RS-232 serial port. Through the GPIO pin 310 the load controller 102 may provide the state of the room 101, such as its vacancy/occupancy status, light levels, light scenes, or the like, to an AV system. Additionally, the load controller 102 may receive control commands from the AV system, for example, to recall a lighting scene, ignore sensor output for a defined period of time, raise or lower light levels, or the like.

Referring to FIG. 1, the various in-room devices, including the load controllers 102 and 122, lighting control device 103, occupancy sensor 104, and light sensor 105, may intercommunicate with each other using the room based wireless network 110. In one embodiment, the room wireless network 110 can comprise one or more wireless personal area networks (PANs). The room wireless network 110 may comprise a peer-to-peer wireless network, for example, such that sensor 104 on the ceiling can directly communicate with load controller 102 or lighting control device 103. The room wireless network 110 may comprise a 2.4 GHz peer-to-peer radio frequency (RF) mesh network topology, where every in-room device may act as an "expander", relaying wireless commands directly between the in-room devices until the commands reach their intended destination. Each in-room device that is added to the room 101 increases the range and stability of the peer-to-peer mesh network by providing multiple redundant signal paths. According to an embodiment, the wireless range between any two in-room devices in the room wireless network 110 may comprise a range of about 50 ft.

In an embodiment, the room wireless network 110 of the lighting control system 100 between the in-room devices is automatically formed upon installation during a wireless network initialization and commissioning process. The in-room devices can communicate directly with each other via a pairing process—e.g., tapping buttons on the load controllers 102/122, lighting control device 103, occupancy sensor 104, and light sensor 105 links these devices together to form the in-room wireless network 110.

According to an embodiment, each load controller in room 101 may act as a router and can take the role of the network coordinator configured for forming the in-room wireless network 110. In rooms with more than one load controller, one load controller, such as load controller 102, may be assigned to be the network coordinator. The load controller 102 may contain a button which commands it to form the network 110. In response, the load controller 102 will act as the network coordinator and will pick the best channel and select a random personal area network (PAN) identification number (ID) that will be used for message exchange over the room wireless network 110. The load controller 102 will then establish the room wireless network 110 and may then permit the other in-room devices to join the network 110.

To join the room based network 110, the other in-room devices can comprise dedicated buttons, or button combinations, configured for commanding the devices to join the network 110. In response, the devices will initiate a network scan to search for best available network. If a network is available and permits devices to join it, the in-room device will perform an association to that network, for example by sending a join request to the network coordinator and receiving a join confirmation message from the network coordinator. According to an embodiment, the in-room device will undergo a security procedure for authentication. If authentication is successful, the in-room device can start acting as an end device. According to another embodiment, the in-room devices utilize the automatic wireless network formation process discussed below to join the room based network 110.

Other load controllers in the room 101, such as load controller 122, may act as routers by routing messages between in-room devices, taking part in re-broadcasting messages, and notifying the network manager in cases of interference detection. Load controllers that are not network managers may discover and synchronize with the network manager and act as trust centers for newly joining devices. Load controllers that act as routers can act as a backup network manager if the coordinator dies or becomes not functional. These load controllers may detect loss of a network manager, for example, upon losing a predetermined number of consecutive network manager synchronization messages from an active network manager, and in response, take up the role of a network manager and notify other in-room devices about its new role.

After network formation, the lighting control system 100 can function as a standalone room based control system within a single room 101 such that the system 100 can respond to sunlight levels, occupancy, button presses, and any integration points through a corresponding load controller 102. The standalone room lighting control system 100 is configured to operate as part of a centralized lighting control system via an addition of a network bridge 120. Without the network bridge 120, the room lighting control system 100 within room 101 stands alone. For example, as shown in FIG. 1, it can work as a standalone room lighting system 100 in a conference room 101 where the load controller 102 receives messages from the wireless lighting control devices 103 and sensors 104-105 and control its associated lighting load 106, outlet 108, or other types of loads, accordingly.

A plurality of standalone room lighting control systems 100 can be scaled up to a centralized lighting control system via the addition of a network bridge 120 to each such lighting control system 100. The network bridge 120 connects to the load controller 102 to provide an interface for centralized monitoring, management and control of individual room lighting control system 100 throughout a building. Accordingly, each room or space in a building comprising a load controller 101 and a network bridge 120 becomes a node of a centralized lighting control system. Each network bridge 120 provides a single point of control and reporting for each connected room or space. According to an embodiment, the network bridge 120 adds a second wireless network interface to the load controller 102 to connect the load controller 102 to a separate wireless network, on top of the room wireless network 110. As such, each network bridge 120 in each room provides the ability for multiple room lighting control systems 100 to be monitored and controlled by a centralized lighting control system, allowing the system to grow exponentially and to be managed centrally. Beneficially, the cost of transforming the room lighting control system 100 into a centralized lighting control system is only incurred when a customer adds the network bridge 120.

According to one embodiment, the various in-room devices and the load controller 102 may be initially installed in the room 101 without the network bridge 120, form the room wireless network 110, and operate as a room based lighting control system 100. Networking the rooms 101 together can be achieved at a later date if the requirements change. The room control system 100 may be connected to the centralized lighting control system 500 (FIG. 5) via a centralized wireless network 500 at a later time by plugging-in the network bridge 120 to any one of the load controllers 102 in room 101. The network bridge 120 is associated with the room 101 in which it is installed. At that point, the network bridge 120 allows communication between all networked rooms 101 and up to the control processors 520. The network bridge 120 allows the system to grow and be managed centrally.

According to another embodiment, during initial instillation, the load controller 102 may be installed in the room 101 with the network bridge 120 already plugged in. The centralized wireless network 510 and the room wireless network 110 may be commanded to be formed via the control processors 520. The network bridges 120 may receive a form network request from the control processor 520, and command the load controller 102 in the room to form the room wireless network 110.

Reference is now made to FIGS. 4A-4B, where FIG. 4A illustrates a perspective front view of the load controller 102 and the network bridge 120 and FIG. 4B illustrates a perspective rear view of the network bridge 120. The load controller 102 may comprise a rectangular housing 405 comprising a front surface 404. A side surface 409 of the housing 405 may comprise a threaded nipple 406 extending therefrom and configured for fitting through a conduit knockout in a junction box 115 to secure the load controller 102 to the junction box 115. The front surface 404 of housing 405 of the load controller 102 may comprise a rectangular shaped recess 402 containing a port 315 and cavities 403. The network bridge 120 may comprise a rectangular housing 410 comprising a front surface 417 and a rear surface 418. The front surface 417 of the housing 410 may comprise a user interface, such as a button 413, and a status light indicator, such as an LED 414. The rear surface 418 of the housing 410 may comprise a plug 325 and hooks 412. Plug 325 may comprise an SPI plug, a USB plug, or the like.

The housing 410 of the network bridge is sized and dimensioned to be recessed within the recess 402 of the housing 405 of the load controller 102. To connect the network bridge 120 to the load controller 102, the housing 410 of the network bridge 120 is at least partially inserted into recess 402 of the load controller 102. The plug 325 of the network bridge 120 connects to port 315 of the load controller 102 allowing bidirectional communication between the two components. The hooks 412 of the network bridge 120 are retained by the cavities 403 of the load controller 102 to maintain the network bridge 120 connected to the load controller 102. Although a rectangular junction box 102 and network bridge 120 are illustrated, other shapes may also be used. Alternatively, the load controller 102 may contain the plug 325 and the network bridge 120 may contain the port 315.

Referring to FIG. 3, there is shown an illustrative block diagram of the network bridge 120. The network bridge 120 may comprise a plug 325, as discussed above, such as an SPI plug, a USB plug, or the like. Plug 325 of the network bridge 120 is configured for connecting to port 315 of the load controller 102 via a bridge interface 319, such as a bus interface, to provide electrical communication between the network bridge 120 and the load controller 102. The network bridge 120 may further comprise a power regulator 323 configured for maintaining a substantially constant voltage level to stabilize the DC voltage signal used by the circuit elements of the network bridge 120. According to an embodiment, the power regulator 323 receives a power signal 331 from the power supply 311 of the load controller 102 through the bridge interface 319. As such, the load controller 102 is configured to provide power to the network bridge 120. The power signal 331 may comprise a 60 mA, 3.3V power signal.

The network bridge 120 may further comprise a user interface 324, such as a button 413, configured for commanding the network bridge 120 to enter into a test mode, a setup mode, a commissioning mode, or the like. The network bridge 120 may further comprise a status light indicator 329, such as an LED 414, for use during set up, maintenance, and troubleshooting.

The network bridge 120 further comprises a wireless network interface 322 configured for bidirectional wireless communication with a centralized wireless network. According to an embodiment, the wireless network interface 322 may comprise a personal area network (PAN) interface, such as a radio frequency (RF) transceiver configured for bidirectional wireless communication over a 2.4 GHz wireless network.

The network bridge 120 can further comprise a CPU 321. CPU 321 can represent one or more microprocessors, and the microprocessors can be "general purpose" microprocessors, a combination of general and special purpose microprocessors, or ASICs. Additionally, or alternatively, the CPU 321 can include one or more RISC processors, video processors, or related chip sets. The CPU 321 can provide processing capability to execute an operating system, run various applications, and/or provide processing for one or more of the techniques and functions described herein. CPU 321 can process various commands and perform operations in response to messages received from the CPU 301 of the load controller 102 or from the building wide network through the wireless network interface 322.

The network bridge 120 can further include a memory 327 communicably coupled to the CPU 321, which can store data and executable code. Memory 327 can represent volatile memory such as RAM, but can also include nonvolatile memory, such as ROM or Flash memory. In buffering or caching data related to operations of the CPU 321, the memory 327 can store data associated with applications running on the control processor 321. Memory 327 can store data files and software for implementing the functions on the control processor 321.

Referring to FIG. 5, there is shown an illustrative block diagram of a centralized lighting control system 500 according to an illustrative aspect of the embodiments. The addition of network bridges 120 to a plurality of rooms 101 allows the plurality of individual room lighting control systems 100 to be monitored and centrally controlled by a centralized lighting control system 500. The centralized control system 500 may connect a few room lighting control systems 100, or may be scaled up to connect room lighting control systems 100 of an entire floor, building, campus, or global corporate offices. According to an embodiment, each network bridge 120 connects its corresponding load controller 102 to the centralized lighting control system 500 over a centralized wireless network 510.

The centralized wireless network 510 may comprise one or more wireless personal area networks (PANs). Communication protocols may govern the operation of centralized wireless network 510 of the centralized control system 500 by governing network formation, communication, interferences, and other operational characteristics. The centralized wireless network 510 may comprise a 2-way 2.4 GHz radio frequency mesh network. Every wireless device on the centralized wireless network 510, including the network bridges 120 and wireless gateways 515 may act as an expander to relay wireless commands ensuring every commands reaches its intended destination. Accordingly, each device that is added to the centralized wireless network 510 increases the range and stability of the entire network by providing multiple redundant signal paths. According to an embodiment, the wireless range between any two devices in the centralized wireless network 510 may comprise a range of about 150 ft.

According to an embodiment, the room wireless network 110 and the centralized wireless network 510 may operate on different protocols, different power strengths, different channels, different latency, different bandwidth, or the like. According to an embodiment, the room wireless networks 110 may comprise a low latency low bandwidth wireless network configured for real-time communication of data between in-room devices. Accordingly, messages between in-room devices may be transmitted quickly for near immediate control of the room 101. On the other hand, the centralized wireless network 510 may comprise a high latency high bandwidth wireless network configured for transmitting large amount of data over the centralized wireless network 510 to a plurality of rooms 101. Because of the modular architecture of the centralized lighting control system 500, no real-time behavior is required by the centralized wireless network 510—enabling large amount of data to be transmitted over the centralized wireless network 510 to control the operation of the individual rooms 101 while not effecting the real-time operation of the in-room devices.

The plurality of network bridges 120 get rolled into the centralized management platform that can run on one or more control processors 520, but could equally be implemented on a personal computer (PC). For example, a building may comprise a plurality of control processors 520, which may also be referred to as floor gateways or floor control hubs, with one or more control processors 520 located on each floor of the building for central floor control. Each control processor 520 may provide a single point of control for a plurality of room lighting control systems 100.

Each control processor 520 may comprise a central processing unit (CPU), a memory, and a plurality of network interfaces. According to an embodiment, each control processor 520 can further include a wireless network interface configured for communication with one or more network bridges 120 over the centralized wireless network 510 to network, manage, and control a plurality of network bridges 120. According to another embodiment, the control processor 520 may include one or more communication network interfaces configured for communication over a control subnet 516 with one or more intermediate wireless gateway devices 515, which in turn communicate with one or more network bridges 120 over the centralized wireless network 510. The one or more communication network interfaces may be further configured for communication over a corporate network 521 and/or the Internet 517. According to an embodiment, the communication network interface may be an Ethernet interface for sending and receiving signals over an Internet Protocol (IP) based network.

The network bridges 120 operate on the centralized wireless network 510 by joining the network 510 via a wireless automatic network formation process, also referred to as the network auto-formation (NAF) process, described in greater detail below. Each network bridge 120 may be configured in a "ready to join network mode" such that as soon as it is connected to and powered by the load controller 102, it will join the centralized wireless network 510. According to one embodiment, each control processor 520 may comprise a wireless network interface configured for directly connecting the network bridges 120 to the control processor 520 over the centralized wireless network 510. In another embodiment, the centralized wireless network 510 may comprise one or more intermediate devices, such as routers or wireless gateways 515 comprising wireless network interfaces that wirelessly connect to the network bridges 120 via the centralized wireless network 510. Each control processor 520 may be connected to one or more intermediate wireless gateways 515 via a control subnet 516, such as a local area network (LAN). In addition, wireless expanders can be added wherever needed to extend the centralized wireless network 510 by filling-in gaps between devices.

The control processors 520 provide centralized management for all connected rooms 101. Applications that can run on the control processors 520 can include, for example, software for initiating the centralized wireless network 510 and software for managing the operation of connected rooms 101. Each control processor 520 may comprise an astronomical time clock enabling the control processor 520 to schedule automated timed events. Each control processor 520 may further aggregate information of all "network enabled" rooms and provide real-time status information to users.

The control processors 520 may further provide connection between the network bridges 120 and cloud service or server 518 via a corporate network 521 and/or the Internet 517 for central building control and aggregation of building information. Cloud services 518 may aggregate information from a plurality of control processors 520 into a centralized management and control platform for an entire building or campus. For example, the cloud service 518 may display a floorplan with status information of the building, provide historical data, reporting, notifications, or the like. According to an embodiment, each control processor 520 may provide a web interface allowing users of the system to log into the webpage and be exposed to all the functionally allowed by the control processor 520, for example to configure time clock events, among other functions.

The following section describes a process for an automatic wireless network formation, or network auto-formation (NAF), executed by one or more of the network bridges 120 to join a gateway 515 to connect the collection of wireless in-room devices (dimmers, switches, keypads, etc.) to the master control system 500. Although a particular network topology is described above, the NAF process discussed below can be applied to other types of systems to connect a device to a wireless personal area network (PAN). As such, the present embodiments provide a wireless personal area network (PAN) operating according to a wireless communication protocol and comprising one or more network devices and joining devices configured for communicating over a wireless network. The one or more network devices comprises any device capable of initializing a PAN. The one or more joining devices comprises any device capable of joining the PAN.

In the context of FIG. 5, the network device may comprise a gateway 515 and the joining device may comprise a network bridge 120 that executes the NAF process discussed herein to join the centralized wireless network 510. According to another embodiment, the network device may comprise the load controller 102 and the joining device may comprise an in-room device that executes the NAF process discussed herein to join the room wireless network 110. However, according to other embodiments, in other types of system configurations, the network device may comprise a centralized management system, a gateway, a router, a load controller, or a similar device capable of initializing a PAN.

The network device may be installed and commanded to initiate and form the PAN. Referring to FIG. 5, a wireless gateway 515 may be installed in a building and commanded by the control processor 520 to form the PAN. In response, the network device will pick the best channel and assign a random PAN ID that it will use for message exchange over the PAN. The PAN ID may comprise a 16-bit value that is used to uniquely identify the PAN. According to an embodiment, the PAN ID may additionally comprises an 8-byte extended PAN ID as an embedded format that identifies whether the network device belongs to the desired network. For example, referring to FIG. 5, each gateway 515 may comprise the same extended PAN ID that identifies that the gateways 515 are part of the centralized control system 500. According to another embodiment, the extended PAN ID may identify the type of network, for example, whether it is a lighting network.

After the network device initiates the network, it will begin transmitting NAF beacons that the joining devices can hear at pre-defined intervals. The NAF beacons may be sent by the network device for a predetermined timeout period, or until commanded to stop from the control system or other program. A joining device may be brought into range and placed in a network join mode to scan and listen to these NAF beacons and join a PAN of the network device. According to an embodiment, the network device may be subsequently commanded to transmit NAF beacons to join additional joining devices to the PAN. The NAF beacons contain network information used by the joining device to determine which network to join, as is further discussed below.

The joining device may be any intermediate or end-node device that joins the PAN formed by the network device. For example, in a pure mesh network topology, the network device may be a first network node, and the parent device may be a second network node that functions as the network coordinator. The joining device is configured to employ the NAF process which allows the joining device to scan all or a subset of channels for NAF beacons in order to join an optimal PAN. The NAF process allows the joining device to pair with a network device without the conventional acquire process. The NAF process discussed herein simplifies, speeds-up, and improves the quality of wireless network formation. The improved NAF process introduces a scan, beacon listening, and network ranking process to the commissioning method. The NAF process is initiated at the network device without having to visit or touch the joining devices or other subject devices to initialize the PAN. In addition, the NAF process allows joining devices to be able to be distributed throughout a large space with multiple network devices without giving any planning considerations.

Referring to FIG. 6, there is shown a flowchart 600 illustrating the main steps of the NAF process according to an illustrative embodiment. In step 602, the joining device performs active scans to find channels with active desired networks for a number of scan/listen cycles. According to an embodiment, the joining device will scan channels in step 602 and listen for NAF beacons in step 604 for a pseudorandom number of scan/listen cycles before making a network join decision. The joining device may randomly generate a Scan Count number within a predetermined range, for example, between 1 through 7, although another number range can be used. The Scan Count defines the number of times the joining device will perform the scan/listen cycles. For example, one joining device may generate a Scan Count number equal to 3 causing it to perform three scan/listen cycles. Another joining device may generate a Scan Count number equal to 6 causing it to perform six scan/listen cycles. A randomly generated Scan Count allows to spread out the scan/listen cycles performed by a plurality of joining devices at the same time. This ensures that not all of the joining devices attempt to join the network device at the same time. If this happens, then the joining devices may make joining decisions at the same time based on old data—not realizing that other devices are attempting to join the PAN. By spreading the scan/listen cycles via the pseudorandom Scan Count, the joining device can see the effects of other joining devices attempting to join the PAN and make better decisions to join the best network.

While performing the active scan in step 602, the joining device identifies channels containing active desired networks that it may potentially join. Referring to FIG. 5, a desired network may, for example, comprise one of the centralized wireless networks 510 (i.e., PANs) formed by the gateway devices 515. Since an active scanning process unnecessarily consumes bandwidth when a plurality of joining devices attempt to join a PAN, it is undesired to continue scanning every channel during each scan/listen cycle. As described below, the NAF process reduces the count of active network scans by scanning less often and enabling only some of the channels when a scan is done. Thus, initially the joining device scans all channels during the first scan/listen cycle to identify channels with active desired networks to join and uses the results of that scan cycle to update control data for the next scan/listen cycle, as will be described in greater detail below.

In step 604, the joining device will then listen on the channels with active desired networks for NAF beacons during the pseudorandom number of scan/listen cycles. According to an embodiment, NAF beacons are out-of-band 15.4 messages containing a variety of information about the network, such as identification, status, and capability, useful in generating network metrics. These NAF beacons can be received by a joining device even without first joining the network. To enable reception by un-joined and unauthenticated joining devices, the NAF beacons may comprise multi-cast secure raw messages. The joining devices are commissioned in a mode where they can hear these raw messages or packets without first needing to go through joining securing handshakes, negotiations, and encryptions. The NAF beacons may contain encryption for security purposes, but one that does not require any prior negotiation. According to an embodiment, joining devices that have already joined the PAN can retransmit these NAF beacon messages to extend the reach of the beaconing to ranges outside of direct contact with the network device.

The NAF beacons comprise network information that identifies the network as well as statistical information regarding the network device and the quality and performance of the PAN. The identification information may include the network PAN ID value, the extended PAN ID value, the network device ID, the network RF channel, or other PAN or network device identifying information. The network performance information may be directly included in the NAF beacon or may be detected or deduced by the joining device based on the information contained in one or more received beacons. Thus, the network information may directly or indirectly comprise a received signal strength indicator (RSSI), a joined device count, a Link Quality Indicator (LQI) value, the number of beacons on the channel, network device's measured RF energy, over-the-air (OTA) messaging throughput, RX throughput on a network device, aggregate ALQI (i.e., LQI data a network device has combined from a plurality of joined devices), route cost, hop count, radius count, as well as other types of performance information.

In step 606, the joining device generates a quality/performance metric based on the content of the received NAF beacons. According to an embodiment, the joining device may generate the performance metric by ranking the PANs based on the network information received from the NAF beacons. According to one embodiment, the joining device may rank the networks according to one of the received categories of network performance information. For example, the joining device may rank the PANs according to the highest RSSI value.

In other embodiments, the joining device may weigh the various network identification and performance information, also referred to as network parameters, according to various factors to rank the PANs to select the best network to join. In one embodiment, the joining device may start up ranking a PAN using a predetermined value and subtract from it factors based on how undesirable a parameter is. For example, a low LQI value—a value that represents the combined quality of all the devices talking to a network device—provides some indication of the corruption or quality of the received beacon signal. A very low RSSI value indicates a poor strength of the received radio signal. Yet, while a RSSI value of a PAN may be high, a low LQI value of the PAN indicates corruption that negates the benefit of a good signal strength.

A PAN with a high joined device count—that indicates the number of devices that have joined the network device—is unfavorable. For load balancing, it is preferred to spread joining devices across all available network devices. The joining device may further consider the number of NAF beacons on the channel. The joining device may output a low rank for PANs on a channel with a large number of NAF beacons to discourage a lot of devices on the same channel, even if they are spread across multiple network devices.

A high network device energy measurements may indicate interference or difficulties transmitting/receiving from its location. A high OTA messaging throughput on a network device—indicating that the network device is communicating a lot—is likely to impact performance of network especially as more devices are added. Thus, it may be better to join a network device that is quieter.

A high mean route cost is a confirmation that sustained communication problems exists. While a network is building and device count is low, but the mean route cost is high, this may not be a problem. But higher device counts with a high mean route cost can imply there is enough coverage while communication problems are still happening.

A high mean hop count, low device count, and a low RSSI or LQI values—collectively indicating that the PAN consists of lots of hopping when there aren't many devices and the signal is poor—implies that the PAN is spread out and adding the joining device to it may not reinforce the network. Similarly, poor mean last hop RSSI at the network device and poor signal from the NAF beacon imply that the joining device is far from the network device such that the joining device will not help reinforce the PAN. A high beacon radius count—indicating that the NAF beacon has been forwarded multiple times—implies that the joining device may end up being multiple hops and thus far away from the network device. Some of the above parameters may be emphasized, while others deemphasized. The joining device may take into account any one or more of the above parameters and factors, and/or may consider alternative or additional performance information or ranking factors to generate the performance metric to rank the PANs.

The joining device will then use the performance metric to select a PAN with the best metric to join in step 608.

FIGS. 7A-7C show a flowchart 700 illustrating the NAF process in a greater detail according to an illustrative embodiment. Beginning with FIG. 7A, the NAF process begins with a setup/initialize process cycle 701. The setup/initialize process cycle 701 may be triggered in response to a boot or a reset event 702. Such an event may occur upon a first startup of the joining device. For example, when a network bridge 120 is first connected to and powered by a load controller 102. The boot/reset event 702 may also occur subsequently, for example, when the joining device and/or the entire system is reset, the joining device is moved to a new location, the joining device is released from the PAN (e.g., due to network failure or manually), or the like.

Initially, in step 704, the joining device initializes any scan/listen control data it collected and updated during a previous NAF process cycle. Upon a first start-up of the joining device, the scan/listen control data may be empty. However, during the execution of the NAF process cycle, the joining device collects and updates the following scan/listen control data: a Desired Network Channel List, a Non-Desired Network Channel List, and a Beacon-Heard Channel List.

The joining device populates the Desired Network Channel List and the Non-Desired Network Channel List during each active network scanning period. The Desired Network Channel List may contain a list of channels on which the joining device identified desired networks. The Non-Desired Network Channel List may contain a list of channels on which the joining device identified non-desired networks. The joining device populates the Beacon-Heard Channel List during each NAF beacon listening period by listing channels on which it heard NAF beacons. These lists are used to generate and update the Scan Channel Mask and the Listen Channel List.

The Scan Channel Mask defines the channels that the joining device does not need to scan during a scan/listen cycle. The Scan Channel Mask comprises the Beacon-Heard Channel List and the Desired Network Channel List, indicating to the joining device not to re-scan these channels since it is already known that there are desired networks present on these channels. The Scan Channel Mask may often comprise the Non-Desired Network Channel List, indicating to the joining device not to re-scan these channels since it is already known that there are undesired networks present on these channels. Once in a while, however, the Scan Channel Mask may not exclude the Non-Desired Network Channel List to take into account that a desired network may be added on these channels. This operation may be prescaled, as discussed below, to limit the bandwidth created on those channels such that scans of channels with undesired networks are enabled at some reduced rate. As such, if a desired network came online after the start of the process its channel would eventually get added to the Desired Channel List of channels to listen. Similarly, if a desired network was removed during the process, its channel would eventually be removed from the Desired Channel List of channels to listen. Accordingly, the NAF process will ensure that the joining device will be able to listen for NAF beacons on any channel with a desired network device, regardless of the starting state of the NAF process.

The Listen Channel List defines the channels that the joining device listens on during a scan/listen cycle. The Listen Channel List comprises the Beacon-Heard Channel List and the Desired Network Channel List, indicating to the joining device to listen on these channels since a desired network and/or NAF beacons were found to be present on these channels.

In step 704, the above scan/listen control data that was previously collected is cleared to ensure reliable startup of the system.

In step 706, the joining device generates a pseudorandom Scan Count (e.g., it randomly picks a number between 1 and 7) defining the number of times the joining device will perform the scan/listen cycles. The joining device also sets a Scan Index to zero. The Scan Index is used to track the number of the scan/listen cycles by being incremented after each scan/listen cycle until it reaches the Scan Count.

In step 708, the joining device also clears a found Network Result List that it maintained from a previous NAF process cycle.

Next, the joining device begins the scan/listen process cycle 710 shown in FIG. 7B. In step 712, the joining device updates the Scan Channel Mask based on the scan/listen control data it collected from previous scan/listen cycles. The Scan Channel Mask defines the channels the joining device should not scan. During a first scan/listen cycle after the boot/reset event 702, this Scan Channel Mask would be empty because the scan/listen control data was cleared up during the initialization cycle 701 of the NAF process. However, in subsequent scan/listen cycles, the Scan Channel Mask is updated using the Beacon-Heard Channel List, the Desired Network Channel List, and normally with the Non-Desired Network Channel List.

Referring to FIG. 8, there is shown a flowchart 800 illustrating the process for updating the Scan Channel Mask in greater detail. Initially in step 802, the joining device clears the Scan Channel Mask collected and updated during the previous scan/listen cycle 710. In step 804, the Beacon-Heard Channel List is masked from the channels the joining device needs to scan. In step 806, the Desired Network Channel List is also masked from the channels the joining device needs to scan. In step 808, a Prescale Index is compared to a Prescale Count. The Prescale Count may be a predetermined valued stored by the joining device. For example, the Prescale Count may comprise the value 2, indicating to the joining device to scan channels in the Non-Desired Network Channel List every two times. The Prescale Index may be initially set to zero during the setup/initialize cycle 701.

If the Prescale Index is less than the Prescale Count, then the Non-Desired Network Channel List is also masked in step 810 from the channels the joining device needs to scan. The Scan Channel Mask is returned in step 812 comprising the Beacon-Heard Channel List, the Desired Network Channel List, and the Non-Desired Network Channel List. As such, the joining device will not scan the channels listed in these lists. The Prescale Index is then incremented in step 814. The Non-Desired Network Channel List is masked during subsequent scan/listen cycles for a number of times corresponding to the predetermined Prescale Count. The Prescale Index is incremented until it is determined in step 808 that it is equal to or larger than the Prescale Count. The process then proceeds to step 816 where the Scan Channel Mask is returned comprising the Beacon-Heard Channel List and the Desired Network Channel List. As such, the joining device will not scan the channels in these lists, but it will scan the channels in the Non-Desired Network Channel List to ensure that any Desired Networks that may have intermittently been added on these channels are found. In step 818, the Prescale Index is reset to zero.

Returning to FIG. 7B, after updating the Scan Channel Mask at the beginning of the scan/listen cycle, the joining device performs an active channel scan in step 714 by masking out channels in the Scan Channel Mask. Since during the first scan/listen cycle the Scan Channel Mask is empty, no channels are masked out, and the joining device performs an active scan of all channels. As such, all the channels are scanned right after a boot/reset event 702. Since it is a limited event, the bandwidth is rarely incurred. In the second and subsequent scan/listen cycles, the Scan Channel Mask is updated with the Beacon-Heard Channel List, Desired Network Channel List, and often with the Non-Desired Network Channel List that were populated from the perceiving scan/listen cycles, as described above with reference to FIG. 8. The joining device performs active channel scans during the subsequent scan/listen cycles by masking out channels in these lists and thereby reducing the scan count and bandwidth. As such, the joining device will only scan channels where it did not hear anything on, instead of re-scanning channels that it knows there are potential joinable PANs there.

The joining device scans each channel for a predetermined amount of time to find potential networks to join. According to an embodiment, the joining device may scan for networks for about 138 ms per channel or for about 260 ms per channel. According to one embodiment, sixteen ISM channels in the 2.4 GHz band are scanned. For example, IEEE 802.15.4 channels 11 through 26 may be scanned. Each time a potential network is found, the joining device determines whether it is a desired network and updates the Desired Network List and the Non-Desired Network List in step 716.

FIG. 10 shows a flowchart 1000 illustrating the process of updating the Desired Network List and the Non-Desired Network List during the channel scan period. In step 1002, the joining device finds a network while scanning a channel during the predetermined channel scan period. The joining device may receive network identifying information for each of the discovered wireless PANs comprising a PAN ID. In step 1004, the joining device may determine whether the found network matches a profile of a desired network. The desired network profile may comprise a collection of parameter values and/or configuration settings that govern the operability of the network. As such, the desired network profile should be the same on all devices that will join the same network. For example, the desired network profile may comprise the Zigbee Stack Profile. If the discovered network does not match the desired network profile, the joining device continues the active channel scan in step 1012 for the remainder of the channel scan period. If the discovered network matches the desired network profile, the joining device moves to step 1006.

In step 1006, the joining device determines whether the PAN ID contains an extended PAN ID, as discussed above, which identifies whether the network device belongs to the desired network. If the joining device sees the extended PAN ID, then the joining device updates the Desired Network List with the scanned channel in step 1008. If the joining device does not see the extended PAN ID, then the joining device updates the Non-Desired Network List with the scanned channel in step 1010. The joining device then continues the active channel scan in step 1012 for the remainder of the channel scan period to discover other channels with desired networks to join. The newly populated Desired Network Channel List and Non-Desired Network Channel List are used to update the subsequent Listen Channel List in step 718 as described below, as well as the Scan Channel Mask during the next scan/listen cycle in step 712 as described above.

Returning to FIG. 7B, the joining device next updates the Listen Channel List in step 718. FIG. 9 shows a flowchart 900 illustrating the update Listen Channel List process in greater detail. Initially in step 902, the joining device clears the Listen Channel List from the previous scan/listen cycle 710. In step 904, the Beacon-Heard Channel List is added to the Listen Channel List. Again, after the first scan after a system boot/reset event 702 the Beacon-Heard Channel List is empty and no channels are added to the Listen Channel List. In step 906, the Desired Network Channel List that was updated during scanning in step 718 is added to the Listen Channel List. In step 908, the Listen Channel List is returned comprising the Beacon-Heard Channel List (which is empty after a first scan after boot/reset event) and Desired Network Channel List.

Returning to FIG. 7B, in step 720, the joining device listens to NAF beacons on channels in the Listen Channel List. During a first scan/listen cycle, after a system boot/reset event 702, the joining devices only listens on channels on which it found desired networks to join in the Desired Network Channel List. In the subsequent scan/listen cycles, the joining devices listens on channels in the Desired Network Channel List that was populated in the preceding scan in step 716, as well as on channels in the Desired Network Channel List and Beacon-Heard Channel List that were added in the preceding scan/listen cycles. Since the actual process of listening for beacons may be quiet slow, it is undesired for the joining devices to listen on channels that may not contain any desired network devices or PANs. Thus, the joining device only listens for NAF beacons on a limited number channels. If the channel contains a desired network there is a good chance that an NAF beacon will be present there. In addition, if an NAF beacon was previously heard on this channel, the joining device is likely to detect additional NAF beacons. In step 722, the joining device receives network information included in the heard NAF beacons.

In step 724, the joining device updates the Beacon-Heard Channel List with channels on which it heard NAF beacons. FIG. 11 shows a flowchart 1100 illustrating the steps of updating the Beacon-Heard Channel List during the channel listen period according to an illustrative embodiment. In step 1102, the joining device finds a NAF beacon while listening on a channel during a predetermined channel listening period. In step 1104, the joining device updates the Beacon-Heard Channel List with the channel on which it heard the NAF beacon. The joining device then continues to listen for NAF beacons in step 1106 for the remainder of the channel listening period. The newly populated Beacon-Heard Channel List is used to update the Scan Channel Mask and the Listen Channel List during the next scan/listen cycle in steps 712 and 718 as described above.

Returning to FIG. 7B, in step 726, the joining device generates a performance metric of discovered networks based on the network information included in the beacons, as discussed in greater detail below.

In step 728, the joining device updates a Network Result List with networks with highest performance metric. According to an embodiment, the Network Result List may be of finite length dependent on a variety of factors such as memory capability. For example, the Network Result List may be limited to four entries. Once four unique networks have been found and the table is filled, an entry with lowest performance metric is replaced each time with a new network with a higher performance metric.

In step 730, the Scan Index is incremented. The incremented Scan Index is compared to the Scan Count in step 732. If the incremented Scan Index is smaller than the Scan Count, then the joining device returns to step 712 to perform the next scan/listen cycle 710. The Scan Index is incremented until it is determined in step 732 that it is equal to or larger than the pseudorandomly generated Scan Count. When that occurs, the scan/listen cycles end and the NAF process proceeds to the join process cycle 740 shown in FIG. 7C.

Referring to FIG. 7C, in step 742, the joining device sorts the Network Result List. Typically, the joining device will sort the Network Result List according to the highest metric. According to an embodiment, if the joining device has previously unsuccessfully attempted to join a PAN, even though it had a high metric, that PAN may be given a lower priority.

In step 744, the joining device attempts to join the first network listed in the Network Result List. The joining device may attempt to join by executing a handshake procedure with the network device. The joining device may send a request to the network device to join the wireless PAN. The network device may issue a response comprising a PAN address to use while associated with the network. If the joining device does not succeed to join that network, the joining device determines whether there are more networks to join in the Network Result List in step 748. If there are more networks to join, the joining device attempts to join the next network in the Network Result List in step 750. If there are no more networks to join in the Network Result List, the joining device returns to step 706 in FIG. 7A to generate a new pseudorandom Scan Count and perform additional scan/listen cycles 710. The joining device proceeds to scan, listen, and attempt to join networks until it succeeds to join a network.

If the joining device succeeds to join a network, the joining device sets its connection state to Join Success in step 754. The joining device then operates on the joined network and will stay on that network until it gets released from that network in step 756. For example, a user may intervene and command to release the joining device from the PAN. This may involve the transmission of one or more message between the joining device and the network device to formally end communication between them to remove the joining device from that network. If that occurs, the joining device will return to the initializing step 704 to repeat the NAF process.

INDUSTRIAL APPLICABILITY

The disclosed embodiments provide a system, software, and a method for automatically forming a wireless network.

It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:
1. A wireless network joining device comprising:
    a personal area network (PAN) interface adapted to communicate with one or more network devices over a wireless network; and
    a processor adapted to:
        direct the PAN interface to perform a number of active channel scans of a plurality of wireless communication channels for desired PANs to join by masking out channels in a desired network channel list;

update the desired network channel list with channels containing desired PANs to join during each channel scan cycle;

direct the PAN interface to listen for beacons on channels in the desired network channel list, wherein each beacon comprises PAN information;

receive PAN information included in heard beacons;

select a PAN to join based on the PAN information; and attempt to join the selected PAN.

2. The wireless network joining device of claim 1, wherein the processor is further adapted to generate a pseudorandom scan count defining the number of channel scan cycles.

3. The wireless network joining device of claim 1, wherein the processor is further adapted to:

upon finding a discoverable PAN during a channel scan cycle, determine whether the found discoverable PAN is a desired PAN to join.

4. The wireless network joining device of claim 3, wherein each desired PAN comprises an extended PAN ID, wherein upon finding the discoverable PAN, the processor receives a PAN ID and determines whether the found discoverable PAN is a desired PAN by determining whether the received PAN ID contains the extended PAN ID.

5. The wireless network joining device of claim 3, wherein the processor is further adapted to update a non-desired network channel list with channels containing non-desired PANs to join during each channel scan cycle.

6. The wireless network joining device of claim 5, wherein during each channel scan cycle the processor is further adapted to mask out channels in the non-desired network channel list.

7. The wireless network joining device of claim 5, wherein during a prescaled number of channel scan cycles the processor is further adapted to mask out channels in the non-desired network channel list.

8. The wireless network joining device of claim 1, wherein during a first channel scan cycle the desired network channel list is empty such that no channels are masked out from the first channel scan cycle.

9. The wireless network joining device of claim 8, wherein the desired network channel list is cleared in response to at least one of a boot event, a reset event, a release event, a failure event, or any combinations thereof.

10. The wireless network joining device of claim 1, wherein the processor masks out channels during a given channel scan cycle based on a desired network channel list that was updated during a previous channel scan cycle.

11. The wireless network joining device of claim 1, wherein the processor is further adapted to update a beacon-heard channel list with channels on which beacons were heard during each channel listen cycle.

12. The wireless network joining device of claim 11, wherein during each channel scan cycle the processor is further adapted to mask out channels in the beacon-heard channel list.

13. The wireless network joining device of claim 11, wherein during each channel listen cycle the processor is adapted to direct the PAN interface to also listen for beacons on channels in the beacon-heard channel list.

14. The wireless network joining device of claim 13, wherein during a first channel listen cycle the beacon-heard channel list is empty.

15. The wireless network joining device of claim 13, wherein the processor directs the PAN interface to listen on channels during a given channel listen cycle based on a beacon-heard channel list that was updated during a previous channel listen cycle.

16. The wireless network joining device of claim 1, wherein the processor is further adapted to generate network performance metric for each PAN for which a beacon was received based on PAN information contained in the received beacon.

17. The wireless network joining device of claim 16, wherein the processor selects a PAN to join according to the generated network performance metric.

18. The wireless network joining device of claim 16, wherein the processor updates a network result list with PANs with highest network performance metric, and wherein the processor attempts to join each PAN in the network result list until a PAN is successfully joined or until there are no more PANs in the network result list to attempt to join.

19. The wireless network joining device of claim 18, wherein the network result list comprises a maximum number of entries.

20. The wireless network joining device of claim 18, wherein the processor attempts to join each PAN in the network result list in the order from highest to lowest network performance metric.

21. The wireless network joining device of claim 20, wherein a PAN to which the joining device has previously unsuccessfully attempted to join is given a lower priority than a PAN to which the joining device has not previously attempted to join.

22. The wireless network joining device of claim 16, wherein the PAN information comprises PAN identifying information and PAN performance information.

23. The wireless network joining device of claim 22, wherein the PAN identifying information comprises at least one of a PAN ID, an extended PAN ID, a network device ID, a network RF channel, or any combinations thereof.

24. The wireless network joining device of claim 22, wherein the PAN performance information comprises at least one of a received signal strength indicator (RSSI), a joined device count, a Link Quality Indicator (LQI), a number of beacons on a channel, a network device's measured RF energy, an over-the-air (OTA) messaging throughput, an RX throughput on a network device, an aggregate ALQI, a route cost, a hop count, a radius count, or any combinations thereof.

25. The wireless network joining device of claim 1, wherein each beacon comprises an out-of-band message.

26. The wireless network joining device of claim 1, wherein each beacon comprises a multi-cast secure raw message.

27. A wireless network joining device comprising:

a personal area network (PAN) interface adapted to communicate with one or more network devices over a wireless network; and a processor adapted to:

direct the PAN interface to perform a first active channel scan of a plurality of wireless communication channels for discoverable PANs;

for each found discoverable PAN, determine whether the discoverable PAN comprises a desired PAN to join;

generate a desired PAN channel list comprising channels containing desired PANs and a non-desired PAN channel list comprising channels containing non-desired PANs;

direct the PAN interface to perform subsequent active channel scans for discoverable PANs by masking out the channels in the desired PAN channel list and the non-desired PAN channel list;
update the desired PAN channel list and the non-desired PAN channel list during each subsequent active channel scan cycle;
direct the PAN interface to listen on the channels in the desired PAN channel list for beacons, wherein each beacon comprises PAN information;
receive PAN information included in heard beacons;
generate network performance metric for each PAN for which a beacon was received based on the PAN information contained in the received beacon;
select a PAN according to the generated network performance metric; and
attempt to join the selected PAN.

28. A wireless network joining device comprising:
a personal area network (PAN) interface adapted to communicate with one or more network devices over a wireless network; and
a processor adapted to:
direct the PAN interface to perform a first active channel scan of a plurality of wireless communication channels for discoverable PANs;
generate a first channel list comprising channels containing discoverable PANs;
direct the PAN interface to perform subsequent active channel scans for discoverable PANs by masking out the channels in the first channel list;
update the first channel list with channels containing discoverable PANs during each subsequent channel scan cycle;
direct the PAN interface to listen on the channels in the first channel list for beacons, wherein each beacon comprises PAN information;
receive PAN information included in heard beacons;
generate network performance metric for each PAN for which a beacon was received based on the PAN information contained in the received beacon;
select a PAN according to the generated network performance metric; and
attempt to join the selected PAN.

29. A wireless network joining device comprising:
a personal area network (PAN) interface adapted to communicate with one or more network devices over a wireless network; and
a processor adapted to:
direct the PAN interface to perform a number of scan/listen cycles by (a) actively scanning a plurality of wireless communication channels for PANs by masking out channels in a scan channel mask, and (b) listening for beacons on channels in a listen channel list;
during each scan/listen cycle:
determine whether each found PAN comprises a desired PAN to join;
dynamically update the scan channel mask with channels containing desired PANs, non-desired PANs, and channels on which beacons were heard;
dynamically update the listen channel list with channels containing desired PANs and channels on which beacons were heard;
receive PAN information included in heard beacons;
generate network performance metric for each PAN for which a beacon was received based on the PAN information contained in the received beacon;
select a PAN according to the generated network performance metric; and
attempt to join the selected PAN.

30. A wireless network system comprising:
at least one network coordinating device adapted to initialize a personal area network (PAN) and comprising a first PAN interface adapted to transmit at least one beacon comprising PAN information over a wireless communication channel;
a network joining device comprising:
a second PAN interface adapted to communicate with one or more network devices over a wireless network; and
a processor adapted to:
direct the second PAN interface to perform a number of active channel scans of a plurality of wireless communication channels for desired PANs to join by masking out channels in a desired network channel list;
update the desired network channel list with channels containing desired PANs to join during each channel scan cycle;
direct the second PAN interface to listen for beacons on channels in the desired network channel list;
receive PAN information included in heard beacons;
select a PAN to join based on the PAN information; and
attempt to join the selected PAN.

31. A method for joining a personal area network (PAN) comprising the steps of:
performing a number of active channel scans of a plurality of wireless communication channels for desired PANs to join by masking out channels in a desired network channel list;
updating the desired network channel list with channels containing desired PANs to join during each channel scan cycle;
listening for beacons on channels in the desired network channel list, wherein each beacon comprises PAN information;
receiving PAN information included in heard beacons;
selecting a PAN to join based on the PAN information; and
attempting to join the selected PAN.

32. A method for joining a personal area network (PAN) comprising the steps of:
performing a first active channel scan of a plurality of wireless communication channels for discoverable PANs;
generating a first channel list comprising channels containing discoverable PANs;
performing subsequent active channel scans for discoverable PANs by masking out the channels in the first channel list;
updating the first channel list with channels containing discoverable PANs during each subsequent channel scan cycle;
listening on the channels in the first channel list for beacons, wherein each beacon comprises PAN information;
receiving PAN information included in heard beacons;
generating network performance metric for each PAN for which a beacon was received based on the PAN information contained in the received beacon;
selecting a PAN according to the generated network performance metric; and
attempting to join the selected PAN.

* * * * *